(12) United States Patent
Chan et al.

(10) Patent No.: US 9,147,155 B2
(45) Date of Patent: Sep. 29, 2015

(54) METHOD AND APPARATUS FOR NEURAL TEMPORAL CODING, LEARNING AND RECOGNITION

(75) Inventors: Victor Hokkiu Chan, Del Mar, CA (US); Jason Frank Hunzinger, Escondido, CA (US); Bardia Fallah Behabadi, Pasadena, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 13/211,091

(22) Filed: Aug. 16, 2011

(65) Prior Publication Data

US 2013/0046716 A1    Feb. 21, 2013

(51) Int. Cl.
*G06F 15/18* (2006.01)
*G06N 3/04* (2006.01)
*G06N 3/08* (2006.01)

(52) U.S. Cl.
CPC .............. *G06N 3/049* (2013.01); *G06N 3/088* (2013.01)

(58) Field of Classification Search
CPC ..... A61N 1/3627; G06N 3/063; G06N 3/061; G06N 3/049; G06N 3/04; G06N 99/005; G06N 3/004; G06N 3/02; G06N 3/0436; G06N 3/0454; G06N 3/0472; G06N 3/0635; G06N 3/08; G06N 3/082; G06F 19/3406; G06F 19/345; G06F 17/30247; G10L 15/16; G06K 9/62; G06K 9/6247
See application file for complete search history.

(56) References Cited

U.S. PATENT DOCUMENTS

| | | | |
|---|---|---|---|
| 5,459,817 A * | 10/1995 | Shima | 706/25 |
| 5,666,079 A | 9/1997 | Ma | |
| 6,505,182 B1 | 1/2003 | Van Den Heuvel | |
| 6,581,046 B1 | 6/2003 | Ahissar | |
| 7,174,325 B1 | 2/2007 | Ascoli | |
| 7,287,014 B2 | 10/2007 | Chen et al. | |
| 7,412,428 B2 | 8/2008 | Nugent | |
| 7,430,546 B1 | 9/2008 | Suri | |
| 7,512,271 B2 | 3/2009 | Matsugu et al. | |
| 7,904,398 B1 | 3/2011 | Repici | |
| 8,433,665 B2 | 4/2013 | Tang et al. | |
| 8,606,732 B2 | 12/2013 | Venkatraman et al. | |
| 8,625,337 B2 | 1/2014 | Wu et al. | |
| 8,694,452 B2 | 4/2014 | Aparin et al. | |
| 8,706,662 B2 | 4/2014 | Chan et al. | |
| 8,756,173 B2 | 6/2014 | Hunzinger et al. | |

(Continued)

FOREIGN PATENT DOCUMENTS

| | | |
|---|---|---|
| JP | 7084978 A | 3/1995 |
| TW | 242981 | 3/1995 |

(Continued)

OTHER PUBLICATIONS

Bako et al. "Hardware Implementation of Delay-coded Spiking-RBF Neural Network for Unsupervised Clustering", OPTIM, 2008, pp. 51-56.*

(Continued)

*Primary Examiner* — Li-Wu Chang
(74) *Attorney, Agent, or Firm* — Rupit M. Patel

(57) ABSTRACT

Certain aspects of the present disclosure support a technique for neural temporal coding, learning and recognition. A method of neural coding of large or long spatial-temporal patterns is also proposed. Further, generalized neural coding and learning with temporal and rate coding is disclosed in the present disclosure.

16 Claims, 32 Drawing Sheets

(56) References Cited

U.S. PATENT DOCUMENTS

| | | | |
|---|---|---|---|
| 2004/0097562 A1* | 5/2004 | Olesen et al. | 514/352 |
| 2006/0235477 A1* | 10/2006 | Rom | 607/9 |
| 2008/0208783 A1 | 8/2008 | Jaros et al. | |
| 2009/0287624 A1* | 11/2009 | Rouat et al. | 706/20 |
| 2009/0313195 A1 | 12/2009 | McDaid et al. | |
| 2010/0076916 A1 | 3/2010 | Van Der Made et al. | |
| 2010/0145402 A1 | 6/2010 | Rom | |
| 2010/0185250 A1 | 7/2010 | Rom | |
| 2010/0220523 A1 | 9/2010 | Modha et al. | |
| 2010/0235310 A1 | 9/2010 | Gage et al. | |
| 2010/0299296 A1 | 11/2010 | Modha et al. | |
| 2010/0299297 A1 | 11/2010 | Breitwisch et al. | |
| 2011/0137843 A1 | 6/2011 | Poon et al. | |
| 2011/0153533 A1 | 6/2011 | Jackson et al. | |
| 2012/0011089 A1 | 1/2012 | Aparin et al. | |
| 2012/0084241 A1 | 4/2012 | Friedman et al. | |
| 2012/0109864 A1 | 5/2012 | Modha | |
| 2012/0150781 A1 | 6/2012 | Arthur et al. | |
| 2013/0024409 A1 | 1/2013 | Hunzinger et al. | |
| 2013/0073491 A1 | 3/2013 | Izhikevich et al. | |
| 2013/0073501 A1 | 3/2013 | Hunzinger et al. | |
| 2013/0103626 A1 | 4/2013 | Hunzinger | |
| 2013/0226851 A1 | 8/2013 | Hunzinger et al. | |
| 2013/0339280 A1 | 12/2013 | Hunzinger et al. | |

FOREIGN PATENT DOCUMENTS

| | | |
|---|---|---|
| WO | 9318474 A1 | 9/1993 |
| WO | 9729437 A1 | 8/1997 |

OTHER PUBLICATIONS

Gilson et al. Emergence of network structure due to spike-timing-dependent plasticity in recurrent neuronal networks. I. Input selectivity—strengthening correlated input pathways, Biol Cybern (2009) 101, pp. 81-102.*

Beerhold et al. "ulse-Processing Neural Net Hardware with Selectable Topology and Adaptive Weights and Delays," IJCNN, 1990, pp. 569-574.*

Bako, L. et al., "Hardware Implementation of Delay-Coded Spiking-RBF Neural Network for Unsupervised Clustering," in 11th International Conference on Optimization of Electrical and Electronic Equipment (OPTIM), 2008, pp. 51-56.

Bohte, S.M. et al., "Unsupervised Clustering with Spiking Neurons by Sparse Temporal Coding and Multilayer RBF Networks," in IEEE Transactions on Neural Networks, 2002, vol. 13(2), pp. 426-435.

Maass, W. et al. "On the complexity of learning for spiking neurons with temporal coding", 1999.

Murakoshi, K. et al., "Firing Time of Neuron by Interference Between Synaptic Inputs," in International Conference on Systems, Man, and Cybernetics (SMC), 1999, pp. 377-382.

Natschlager, T. et al., "Spatial and temporal pattern analysis via spiking neurons", in Institute for Theoretical Computer Science Technische Universitat Gratz, Austria, pp. 9(3): 319-32, 1998.

Ruf, B. et al, "Hebbian learning in networks of spiking neurons using temporal coding", in Biological and artificial computation: From neuroscience to technology, pp. 380-389, 1997.

Clopath, et al.,. "Predicting Neuronal Activity with Simple Models of the Threshold Type: Adaptive Exponential Integrate-and-Fire Model with Two Compartments," Preprint submitted to Elsevier Science, Aug. 29, 2006, 6 pgs.

Dan et al., Spike timing-dependent review plasticity of neural circuits, Neuron, Sep. 2004, pp. 23-30, vol. 44.

Duro, et al., "Discrete-Time Backpropagation for Training Synaptic Delay-Based Artificial Neural Networks," IEEE Transactions on Neural Networks, vol. 10, No. 4, Jul. 1999, pp. 779-789.

Froemke, et al. "Spike-timing-dependent synaptic modification induced by natural spike trains," Division of Neurobiology, Department of Molecular and Cell Biology, UC Berkeley, Nature, letters to nature, vol. 416, Mar. 2002, 6 pgs.

Froemke, et al.,. "Temporal modulation of spike-timing-dependent plasticity," Frontiers in Synaptic Neuroscience, vol. 2, Article 19, Jun. 2010, 16 pgs.

Huerta, et al., "Bidirectional Synaptic Plasticity Induced by a Single Burst during Cholinergic Theta Oscillation in CA1 In Vitro," Neuron vol. 15, 1995, pp. 1053-1063.

Kubota et al., "Modulation of LTP/LTD balance in STDP by an activity-dependent feedback mechanism," Neural Network, vol. 22, 2009, pp. 527-535.

Senn, et al., "An Algorithm for Synaptic Modification Based on Exact Timing of Pre- and Post-Synaptic Action Potentials," In Proceedings: ICANN, 1997, 6 pgs.

Amemori, K.I., et al., "Self-organization of delay lines by spike-time-dependent learning", Neurocomputing, Elsevier Science Publishers, Amsterdam, NL, vol. 61, Oct. 1, 2004, pp. 291-316, XP004568343, ISSN: 0925-2312, DOI: 10.1016/J.Neucom.2003.09.013 p. 291-p. 315.

Arena, P., et al., "STDP with adaptive synaptic delay for robot navigation control". Proceedings of SPIE, vol. 6592, May 18, 2007, XP055049378, ISSN: 0277-786X, DOI: 10.1117/12.724204 pp. 65920J-1-pp. 65920J-9, paragraph 3.

Babadi, B., et al., "Intrinsic Stability of Temporally Shifted Spike-Timing Dependent Plasticity", PLOS Computational Biology, vol. 6, No. 11, Jan. 1, 2010, pp. e1000961-el000961, XP55040430, ISSN: 1553-734X, DOI: 10.1371/journai.pcbi.1000961 p. 1-p. 13, right-hand column, paragraph 4.

Bofill-I-Petit, A., et al., "Synchrony Detection and Amplification by Silicon Neurons With STDP Synapses", IEEE Transactions on Neural Networks, Service Center, Piscataway, NJ, US, vol. 15, No. 5, Sep. 1, 2004, pp. 1296-1304, XP011118617, ISSN: 1045-9227, DOI: 10.1109/TNN.2004.832842 p. 1296-p. 1303, right-hand column, paragraph 2.

Bothe, S.M., et al., "Reducing Spike Train Variability: A Computational Theory of Spike-Timing Dependent Plasticity", Advances in Neural Information Processing Systems (NIPS) 17, Jan. 1, 2005, pp. 201-208, XP055052246, Cambridge, MA [retrieved on Feb. 4, 2013].

Cameron, K., et al., "Spike Timing Dependent Adaptation for Mismatch Compensation", 2006 IEEE International Symposium on Circuits and Systems May 21-24, 2006 Island of Kos, Greece, IEEE—Piscataway, NJ,USA,May 21, 2006, XP010938590, DOI: 10.1109/ISCAS.2006.1692812 ISBN: 978-0-7803-9389-9, pp. 1223-1226.

Cap0rale, N., et al., "Spike Timing-Dependent Plasticity: A Hebbian Learning Rule", Annual Review of Neur0science, vol. 31, No. 1, Jul. 1, 2008, pp. 25-46, XP055052234, ISSN: 0147-006X, DOI: 10.1146/annurev.neuro.31.06G407.125639 abstract; figure 1 p. 31, left-hand column, paragraph 2—p. 36, left-hand column, paragraph 1.

Gils0n, M., et al., "Stability versus Neuronal Specialization for STDP: Long-Tail Weight Distributions Solve the Dilemma", PL0S ONE, vol. 6, No. 10, Jan. 1, 2011, p. e25339, XP055052242, ISSN: 1932-6203, DOI: 10.1371/journal.pone.0025339.

Johnston, S.P., et al., "A Hybrid Learning Algorithm Fusing STDP with GA based Explicit Delay Learning for Spiking Neurons", Intelligent Systems, 2006 3rd International IEEE Conference on, IEEE, PI, Sep. 1, 2006, XP031078858, DOI: 10.1109/IS.2006.348493ISBN: 978-1-4244-0195-6, pp. 632-637.

Paugam-Moisy, H., et al., "A supervised learning approach based on STDP and polychronization in spiking neuron networks", ESANN'2007 proceedings—European Symposium on Artificial Neural Networks, Apr. 1, 2007, pp. 25-27, XP055049375, Bruges, Belgium ISBN: 2930307072Retrieved from the Internet: URL:http://www.elen.ucl.ac.be/Proceedings/esann/esannpdf/es2007-95.pdf [retrieved on Jan. 11, 2013]p. 427-p. 432, line 4.

Schemmel J. et al., "Implementing Synaptic Plasticity in a VLSI Spiking Neural Network Model", International Joint Conference on Neural Networks, 2006. IJCNN '06, Piscataway, NJ: IEEE Operations Center, Piscataway, NJ, USA, Jan. 1, 2006, pp. 1-6, XP002557202, ISBN: 978-0-7803-9490-2 Retrieved from the Internet: URL:http://www.kip.uni-heidelberg.de/Veroeffentiichungen/download.cgi/4620/ps/1774.pdf [retrieved on Nov. 23, 2009].

Standage, D., et al., "The Trouble with Weight-Dependent STDP", Neural Networks, 2007. IJCNN 2GG7. International Joint Confer-

(56) References Cited

OTHER PUBLICATIONS ence on, IEEE, Piscataway, NJ, USA, Aug. 1, 2007, pp. 1348-1353, XP031154790, ISBN: 978-1-4244-1379-9.
Tanaka, H., et al., "A CMOS Spiking Neural Network Circuit with Symmetric/Asymmetric STDP Function", IEICE Transactons on Fundamentals of Electronics, Communications and Computer Sciences, Engineering Sciences Society, Tokyo, JP, vol. E92A, No. 7, Jul. 1, 2009, pp. 1690-1698, XP001547503, ISSN: 0916-8508, DOI: 10.1587/TRANSFUN.E92.A.1690 p. 1690-p. 1696, right-hand column.
Brette et al.,"Simulation of networks of spiking neurons: A review of tools and strategies," Springer, Journal of Computational Neuroscience, vol. 23, pp. 349-398, 2007.
Hunzinger, J.V., et al., "Learning complex temporal patterns with resource-dependent spike timing-dependent plasticity", Journal of Neurophysiology, vol. 108, No. 2, Jul. 15, 2012, pp. 551-566, XP055069720, ISSN: 0022-3077, DOI:10.1152/jn.01150.2011 the whole document.
International Search Report and Written Opinion—PCT/US2012/050781—ISA/EPO—Jun. 27, 2013.
Nageswaran, J.M., et al., "A configurable simulation environment for the efficient simulation of large-scale spiking neural networks on graphics processors", Neural Networks, Elsevier Science Publishers, Barking, GB, vol. 22, No. 5-6, Jul. 1, 2009, pp. 791-800, XP026446158.
Park, H.O., et al., "Discrete Synapse Recurrent Neural Network for nonlinear system modeling and its application on seismic signal classification", Neural Networks (IJCNN), The 2010 International Joint Conference on, IEEE, Piscataway, NJ, USA, Jul. 18, 2010, pp. 1-7, XP031771705.
Schaik, A.V., et al., "A log-domain implementation of the Izhikevich neuron model", IEEE International Symposium on Circuits and Systems. ISCAS 2010—May 30-Jun. 2, 2010—Paris, France, IEEE, US, May 30, 2010, pp. 4253-4256, XP031724796, ISBN: 978-1-4244-5308-5 the whole document.
Bishop W.B., "Estimating the posterior probability of LTP failure by sequential Bayesian analysis of an imperfect Bernoulli trial model," IEEE Transactions on Biomedical Engineering, vol. 48, No. 6, Jun. 2001, pp. 670-683, XP011007084, D0I: 10.1109/10.923785 Section III.A.1.
Friedrich J., et al., "Dynamics of recurrent neural networks with delayed unreliable synapses: metastable clustering," Journal of Computational Neur0science, vol. 27, No. 1, Dec. 10, 2008, pp. 65-80, XP019730519, D0I:10.1007/S10827-008-0127-1 Section 2.
Lubenov E.B., et al., "Decoupling through synchrony in neuronal circuits with propagation delays", Neuron, vol. 58, No. 1, Apr. 9, 2008, pp. 118-131, XP055101258, D0I:10.1016/j.neuron.2008.01.036 Experimental procedures.
Morrison A., et al., "Phenomenological models of synaptic plasticity based on spike timing," Biological Cybernetics, vol. 98, No. 6, Apr. 9, 2008, pp. 459-478, XP019630139, D0I: 10.1007/S00422-008-0233-1 Section 4.1.3.
Eurich C W.,et al. "Dynamic of Self-Organized Delay Adaptation", Physical Review Letters, vol. 82, No. 7, Feb. 1999, pp. 1594-1597.
Taiwan Search Report—TW101129574—TIPO—May 24, 2014.
Lam J., et al., "Novel global robust stability criteria for interval neural networks with multiple time-varying delays" Physics Letters A 342. 4, 2005, pp. 322-330.
Liu X., et al., "Global exponential stability of generalized recurrent neural networks with discrete and distributed delays" Neural Networks 19.5, 2006, pp. 667-675.
Qu Y., et al., "Global robust stability of delayed recurrent neural networks" Chaos, Solitons & Fractals 23.1, 2005, pp. 221-229.
Schrauwen B., et al,. "Extending SpikeProp," Neural Networks, 2004. Proceedings. 2004 IEEE International Joint Conference on, vol. 1, no., pp. 475, 25-29 Jul. 2004, DOI: 10.1109/IJCNN.2004.1379954.
Zidong., et al., "Exponential stability of uncertain stochastic neural networks with mixed time-delays" Chaos, Solitons & Fractals 32.1, 2007, pp. 62-72.

\* cited by examiner

1900

1902

PROVIDE, VIA SYNAPSES WITH ASSOCIATED DELAYS, SYNAPTIC INPUTS INTO A NEURON CIRCUIT, WHEREIN AT LEAST ONE OF THE SYNAPTIC INPUTS IS ASSOCIATED WITH AT LEAST ONE OF THE SYNAPSES BEING SELF-CONNECTED, THE SYNAPSES BELONG TO A PLURALITY OF SETS, AND AT LEAST ONE OF THE SETS COMPRISES A DELAY COMBINATION TO MATCH A FIRST PART OF A PATTERN OF THE SYNAPTIC INPUTS NOT COMPRISING A RECURSIVE SELF-CONNECTION

MEANS FOR PROVIDING, VIA SYNAPSES WITH ASSOCIATED DELAYS, SYNAPTIC INPUTS INTO A NEURON CIRCUIT, WHEREIN AT LEAST ONE OF THE SYNAPTIC INPUTS IS ASSOCIATED WITH AT LEAST ONE OF THE SYNAPSES BEING SELF-CONNECTED, THE SYNAPSES BELONG TO A PLURALITY OF SETS, AND AT LEAST ONE OF THE SETS COMPRISES A DELAY COMBINATION TO MATCH A FIRST PART OF A PATTERN OF THE SYNAPTIC INPUTS NOT COMPRISING A RECURSIVE SELF-CONNECTION

FIG. 19A

METHOD AND APPARATUS FOR NEURAL TEMPORAL CODING, LEARNING AND RECOGNITION

BACKGROUND

1. Field

Certain aspects of the present disclosure generally relate to neural system engineering and, more particularly, to a method and apparatus of neural temporal coding, learning and recognition.

2. Background

Neurons in a neural system can communicate information temporally using so-called temporal codes in the form of timed spikes. Because of this, methods of coding and decoding and methods of learning such temporal information are of primary interest.

In particular, it is desired to distinguish temporal patterns and, in contrast to other temporal pattern methods, not merely coincidence of inputs or order of inputs. The present disclosure provides methods that are biologically-inspired/consistent but reduced in complexity and capable of coding, decoding, recognizing, and learning temporal spike signal patterns.

SUMMARY

Certain aspects of the present disclosure provide a method of neural temporal coding. The method generally includes utilizing a relative delay line abstraction which delays one or more synaptic inputs into a neuron circuit by time delays, applying a dynamic spiking model to determine spiking behavior of the neuron circuit based on weighted and delayed synaptic inputs of the neuron circuit, and adjusting, according to an unsupervised learning rule, weights associated with the synaptic inputs depending on timing relation of the neuron circuit spiking and the delayed synaptic inputs.

Certain aspects of the present disclosure provide an apparatus for neural temporal coding. The apparatus generally includes a first circuit configured to utilize a relative delay line abstraction which delays one or more synaptic inputs into a neuron circuit by time delays, a second circuit configured to apply a dynamic spiking model to determine spiking behavior of the neuron circuit based on weighted and delayed synaptic inputs of the neuron circuit, and a third circuit configured to adjust, according to an unsupervised learning rule, weights associated with the synaptic inputs depending on timing relation of the neuron circuit spiking and the delayed synaptic inputs.

Certain aspects of the present disclosure provide an apparatus for neural temporal coding. The apparatus generally includes means for utilizing a relative delay line abstraction which delays one or more synaptic inputs into a neuron circuit by time delays, means for applying a dynamic spiking model to determine spiking behavior of the neuron circuit based on weighted and delayed synaptic inputs of the neuron circuit, and means for adjusting, according to an unsupervised learning rule, weights associated with the synaptic inputs depending on timing relation of the neuron circuit spiking and the delayed synaptic inputs.

Certain aspects of the present disclosure provide a computer program product for neural temporal coding. The computer program product generally includes a computer-readable medium comprising code for utilizing a relative delay line abstraction which delays one or more synaptic inputs into a neuron circuit by time delays, applying a dynamic spiking model to determine spiking behavior of the neuron circuit based on weighted and delayed synaptic inputs of the neuron circuit, and adjusting, according to an unsupervised learning rule, weights associated with the synaptic inputs depending on timing relation of the neuron circuit spiking and the delayed synaptic inputs.

Certain aspects of the present disclosure provide a method of neural temporal coding of long and large spatial-temporal patterns. The method generally includes connecting each layer of neuron circuits in a hierarchical multi-layer neural network to an input and to another layer of neuron circuits in the multi-layer neural network, and matching a first layer of neuron circuits in the multi-layer neural network with a first subsection of an input pattern, wherein that connected layer matches combination of firing of neuron circuits of the other layer as a result of matching a subsection of the input pattern and another subsection of the input pattern.

Certain aspects of the present disclosure provide an apparatus for neural temporal coding of long and large spatial-temporal patterns. The apparatus generally includes a first circuit configured to connect each layer of neuron circuits in a hierarchical multi-layer neural network to an input and to another layer of neuron circuits in the multi-layer neural network, and a second circuit configured to match a first layer of neuron circuits in the multi-layer neural network with a first subsection of an input pattern, wherein that connected layer matches combination of firing of neuron circuits of the other layer as a result of matching a subsection of the input pattern and another subsection of the input pattern.

Certain aspects of the present disclosure provide an apparatus for neural temporal coding of long and large spatial-temporal patterns. The apparatus generally includes means for connecting each layer of neuron circuits in a hierarchical multi-layer neural network to an input and to another layer of neuron circuits in the multi-layer neural network, and means for matching a first layer of neuron circuits in the multi-layer neural network with a first subsection of an input pattern, wherein that connected layer matches combination of firing of neuron circuits of the other layer as a result of matching a subsection of the input pattern and another subsection of the input pattern.

Certain aspects of the present disclosure provide a computer program product for neural temporal coding of long and large spatial-temporal patterns. The computer program product generally includes a computer-readable medium comprising code for connecting each layer of neuron circuits in a hierarchical multi-layer neural network to an input and to another layer of neuron circuits in the multi-layer neural network, and matching a first layer of neuron circuits in the multi-layer neural network with a first subsection of an input pattern, wherein that connected layer matches combination of firing of neuron circuits of the other layer as a result of matching a subsection of the input pattern and another subsection of the input pattern.

Certain aspects of the present disclosure provide a method of neural temporal coding of long and large spatial-temporal patterns. The method generally includes providing, via synapses with associated delays, synaptic inputs into a neuron circuit, wherein at least one of the synaptic inputs is associated with at least one of the synapses being self-connected, the synapses belong to a plurality of sets, and at least one of the sets comprises a delay combination to match a first part of a pattern of the synaptic inputs not comprising a recursive self-connection.

Certain aspects of the present disclosure provide an apparatus for neural temporal coding of long and large spatial-temporal patterns. The apparatus generally includes a first circuit configured to provide, via synapses with associated delays, synaptic inputs into a neuron circuit, wherein at least one of the synaptic inputs is associated with at least one of the synapses being self-connected, the synapses belong to a plurality of sets, and at least one of the sets comprises a delay combination to match a first part of a pattern of the synaptic inputs not comprising a recursive self-connection.

Certain aspects of the present disclosure provide an apparatus for neural temporal coding of long and large spatial-temporal patterns. The apparatus generally includes means for providing, via synapses with associated delays, synaptic inputs into a neuron circuit, wherein at least one of the synaptic inputs is associated with at least one of the synapses being self-connected, the synapses belong to a plurality of sets, and at least one of the sets comprises a delay combination to match a first part of a pattern of the synaptic inputs not comprising a recursive self-connection.

Certain aspects of the present disclosure provide a computer program product for neural temporal coding of long and large spatial-temporal patterns. The computer program product generally includes a computer-readable medium comprising code for providing, via synapses with associated delays, synaptic inputs into a neuron circuit, wherein at least one of the synaptic inputs is associated with at least one of the synapses being self-connected, the synapses belong to a plurality of sets, and at least one of the sets comprises a delay combination to match a first part of a pattern of the synaptic inputs not comprising a recursive self-connection.

Certain aspects of the present disclosure provide a method of neural coding for general input patterns. The method generally includes connecting one or more synapses to a neuron circuit with a soma, each of the one or more synapses corresponding to an input afferent of the neuron circuit and having a weight and relative delay, and incurring, by each of the relative delays, a delay between the corresponding input afferent and the soma, wherein one or more sets of the one or more synapses have delays and input afferents corresponding to sub-patterns that form, in combination, one of the general input patterns, and the sub-patterns comprise at least one of coincidences, firing rates, or temporal patterns.

Certain aspects of the present disclosure provide an apparatus for neural coding for general input patterns. The apparatus generally includes a first circuit configured to connect one or more synapses to a neuron circuit with a soma, each of the one or more synapses corresponding to an input afferent of the neuron circuit and having a weight and relative delay, and a second circuit configured to incur, by each of the relative delays, a delay between the corresponding input afferent and the soma, wherein one or more sets of the one or more synapses have delays and input afferents corresponding to sub-patterns that form, in combination, one of the general input patterns, and the sub-patterns comprise at least one of coincidences, firing rates, or temporal patterns.

Certain aspects of the present disclosure provide an apparatus for neural coding for general input patterns. The apparatus generally includes means for connecting one or more synapses to a neuron circuit with a soma, each of the one or more synapses corresponding to an input afferent of the neuron circuit and having a weight and relative delay, and means for incurring, by each of the relative delays, a delay between the corresponding input afferent and the soma, wherein one or more sets of the one or more synapses have delays and input afferents corresponding to sub-patterns that form, in combination, one of the general input patterns, and the sub-patterns comprise at least one of coincidences, firing rates, or temporal patterns.

Certain aspects of the present disclosure provide a computer program product for neural coding for general input patterns. The computer program product generally includes a computer-readable medium comprising code for connecting one or more synapses to a neuron circuit with a soma, each of the one or more synapses corresponding to an input afferent of the neuron circuit and having a weight and relative delay, and incurring, by each of the relative delays, a delay between the corresponding input afferent and the soma, wherein one or more sets of the one or more synapses have delays and input afferents corresponding to sub-patterns that form, in combination, one of the general input patterns, and the sub-patterns comprise at least one of coincidences, firing rates, or temporal patterns.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 19 illustrates other example operations that may be performed at a neuron circuit of a neural network for neural temporal coding of long and large spatial-temporal patterns in accordance with certain aspects of the present disclosure.

FIG. 19A illustrates example components capable of performing the operations illustrated in FIG. 19.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
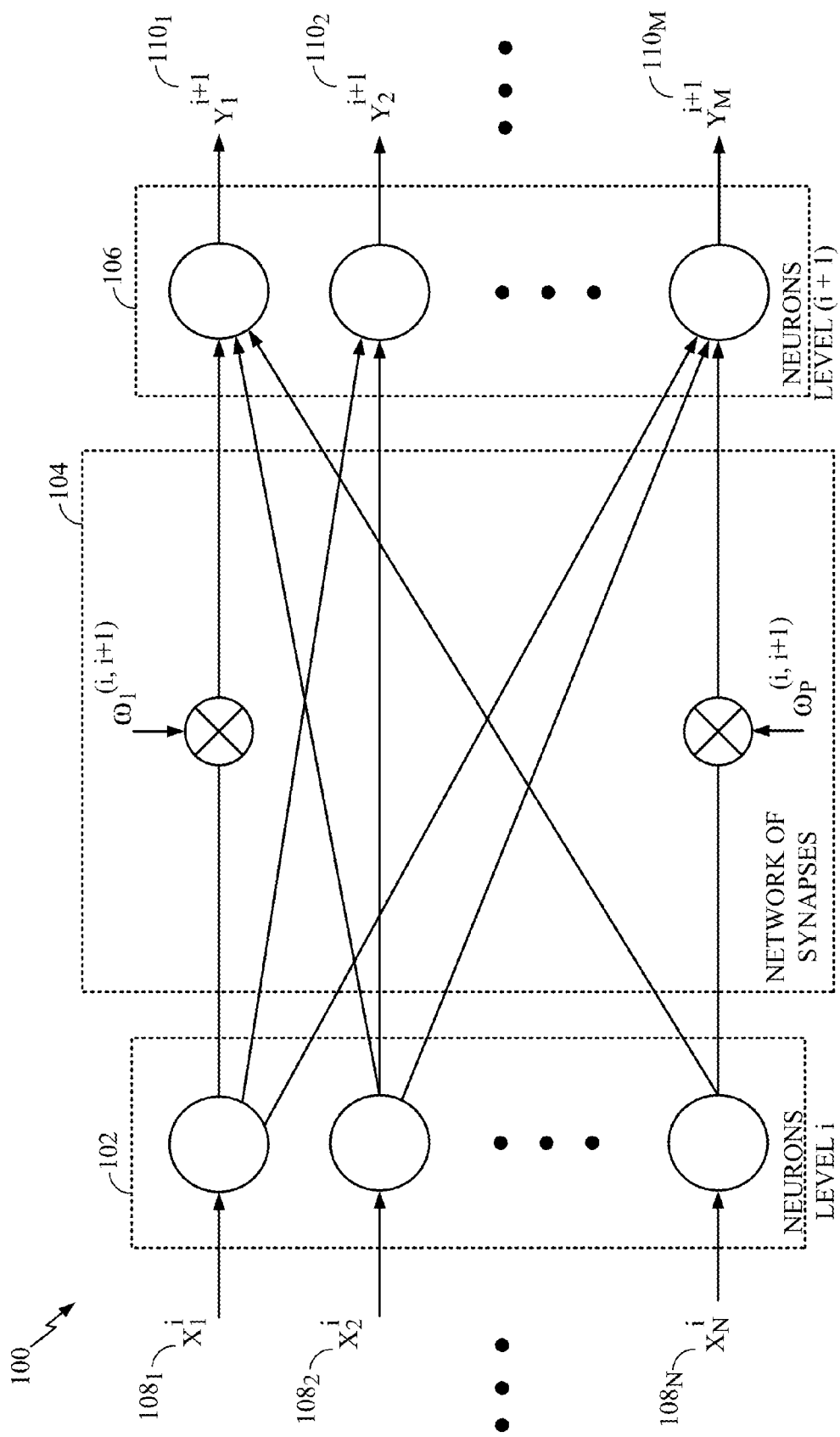
FIG. 1 illustrates an example network of neurons in accordance with certain aspects of the present disclosure.

FIG. 1 illustrates an example neural system 100 with multiple levels of neurons in accordance with certain aspects of the present disclosure. The neural system 100 may comprise a level of neurons 102 connected to another level of neurons 106 though a network of synaptic connections 104. For simplicity, only two levels of neurons are illustrated in FIG. 1, although fewer or more levels of neurons may exist in a typical neural system.

As illustrated in FIG. 1, each neuron in the level 102 may receive an input signal 108 that may be generated by a plurality of neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike to be transferred to the next level of neurons (e.g., the level 106).

The transfer of spikes from one level of neurons to another may be achieved through the network of synaptic connections (or simply "synapses") 104, as illustrated in FIG. 1. The synapses 104 may receive output signals (i.e., spikes) from the level 102 neurons, scale those signals according to adjustable synaptic weights $w_1^{(i,i+1)}, \ldots, w_P^{(i,i+1)}$ (where P is a total number of synaptic connections between the neurons of levels 102 and 106), and combine the scaled signals as an input signal of each neuron in the level 106. Every neuron in the level 106 may generate output spikes 110 based on the corresponding combined input signal. The output spikes 110 may be then transferred to another level of neurons using another network of synaptic connections (not shown in FIG. 1).

The neural system 100 may be emulated by an electrical circuit and utilized in a large range of applications, such as image and pattern recognition, machine learning, motor control, and alike. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

Method of Neural Temporal Pattern Coding, Learning and Recognition

Since neuron circuits of the neural system 100 may communicate information temporally using so-called temporal codes in the form of timed spikes, the coding and decoding methods as well as methods of learning such temporal information are of primary interest. Certain aspects of the present disclosure support methods for distinguishing temporal patterns and, in contrast to other "temporal pattern" methods, not merely coincidence of inputs or order of inputs. Moreover, the present disclosure proposes practical methods that are biologically-inspired/consistent but reduced in complexity and capable of coding, decoding, recognizing, and learning temporal spike signal patterns.

Figure 2:
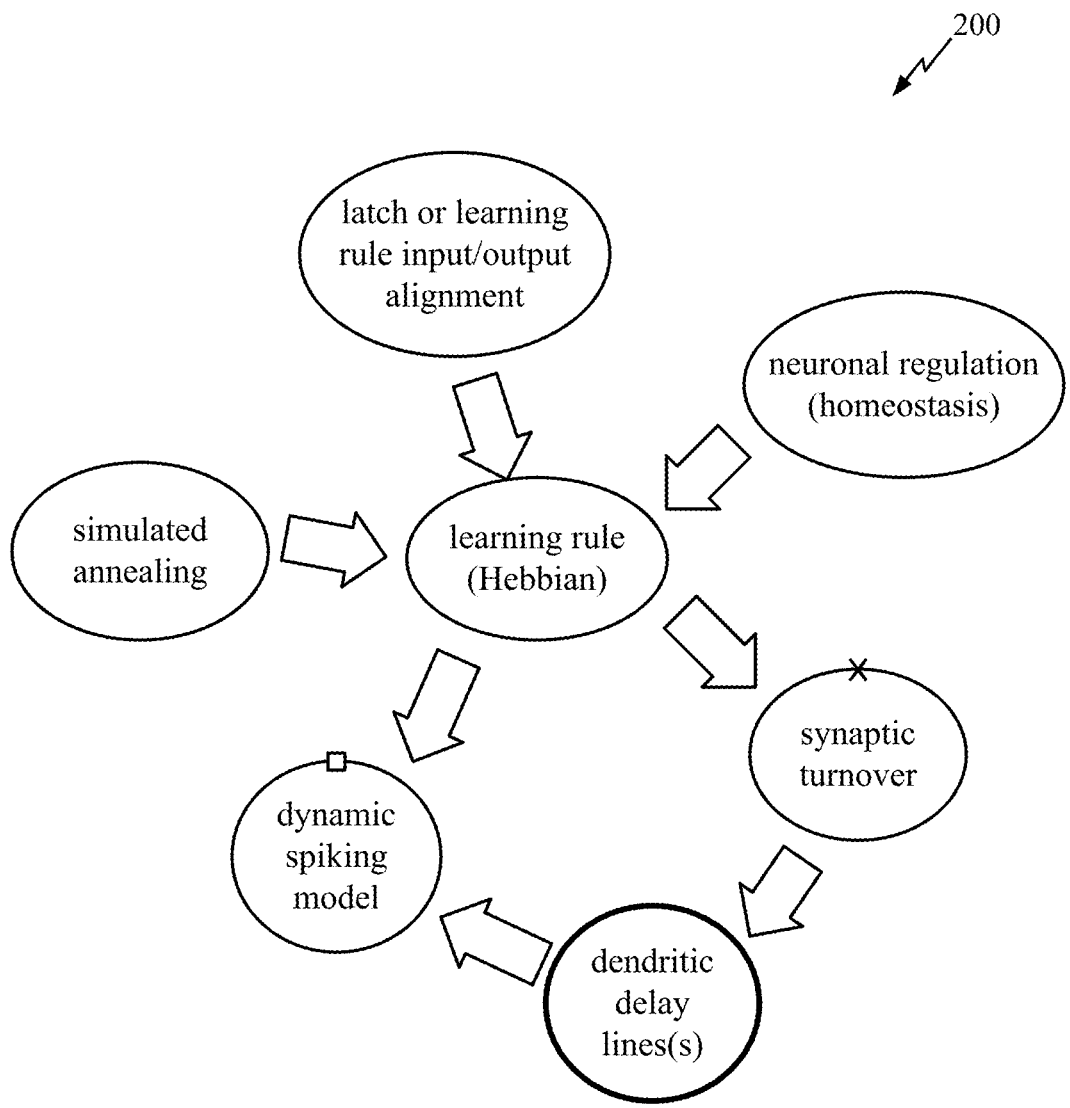
FIG. 2 illustrates an example of method component and features in accordance with certain aspects of the present disclosure

A system proposed in the present disclosure may comprise a combination of interdependent features illustrated in FIG. 2. In general, the system 200 may revolve around an aspect of learning (e.g., Hebbian learning) and an aspect of execution (dynamic spiking model). Relative input timing for the spiking model may be determined by the dendritic delay line(s) aspect, which may be influenced by synaptic turnover and other aspects. The learning may determine synaptic weights as well as impacts on other aspects, and it may be influenced by regulation (normalization), alignment, annealing, as well as other aspects. Each of these aspects is explained in the present disclosure, along with the relationship to other aspects, and their importance, parameters, and advantages.

Relative Delay and Dendritic Delay Lines

Figure 3:
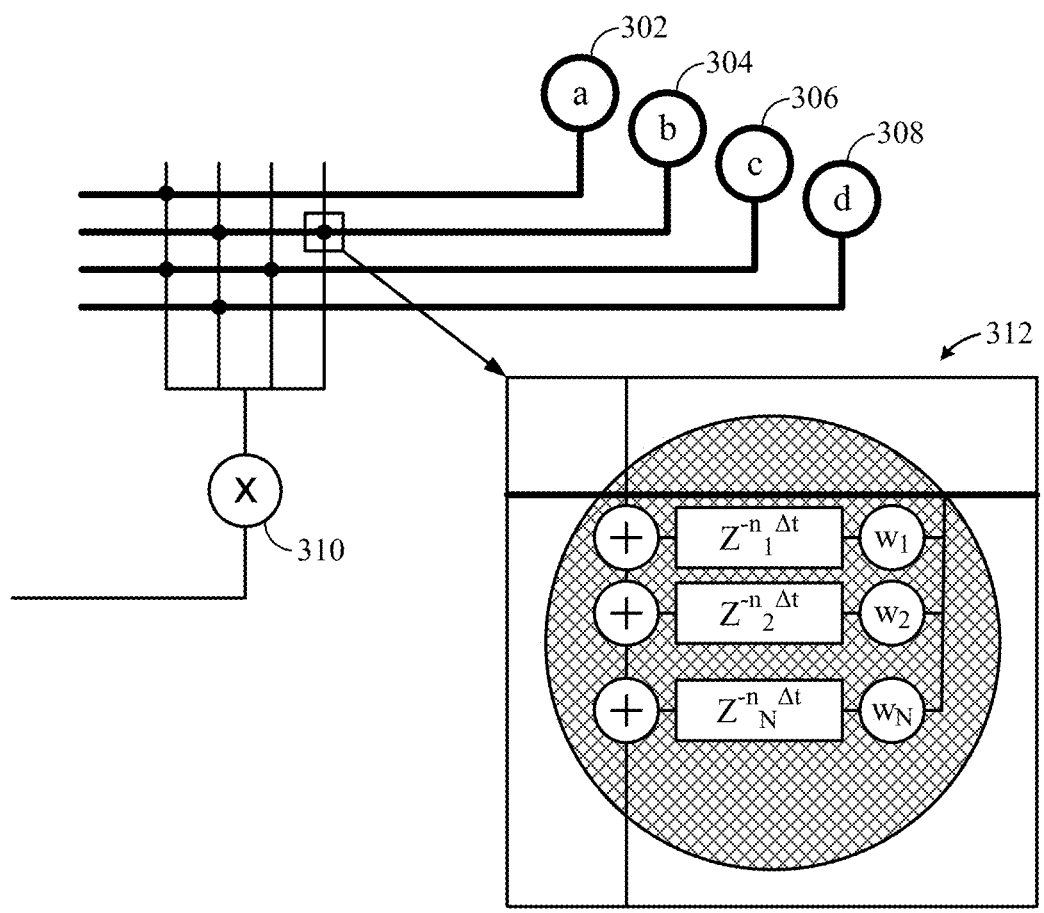
FIG. 3 illustrates an example relative delay neuron model in accordance with certain aspects of the present disclosure.

A method is proposed in the present disclosure in which a neuron's behavior may be determined based on a relative delay between inputs at synapses, a relative delay between inputs at synapses and a reference input, or both. The basic aspect of the temporal coding model is illustrated in FIG. 3. The spatial-temporal pattern of spikes output from neurons 302, 304, 306, 308 (i.e., input neurons) may constitute spike inputs for a neuron 310 (i.e., an output neuron). Each input neuron may connect to the neuron 310 via one or more synapses on one or more dendrite of the neuron 310. Each synapse may have an associated delay that characterizes the time delay that a spike from the input neuron undergoes before reaching the soma of neuron 310, as illustrated in FIG. 3 for synapses 312 connecting the neuron 304 with the neuron 310. As illustrated in FIG. 3, the inputs may undergo scaling before delay and integration. Alternatively, the inputs may undergo delay before scaling for reduced processing in large-scale neural networks.

Figure 4:
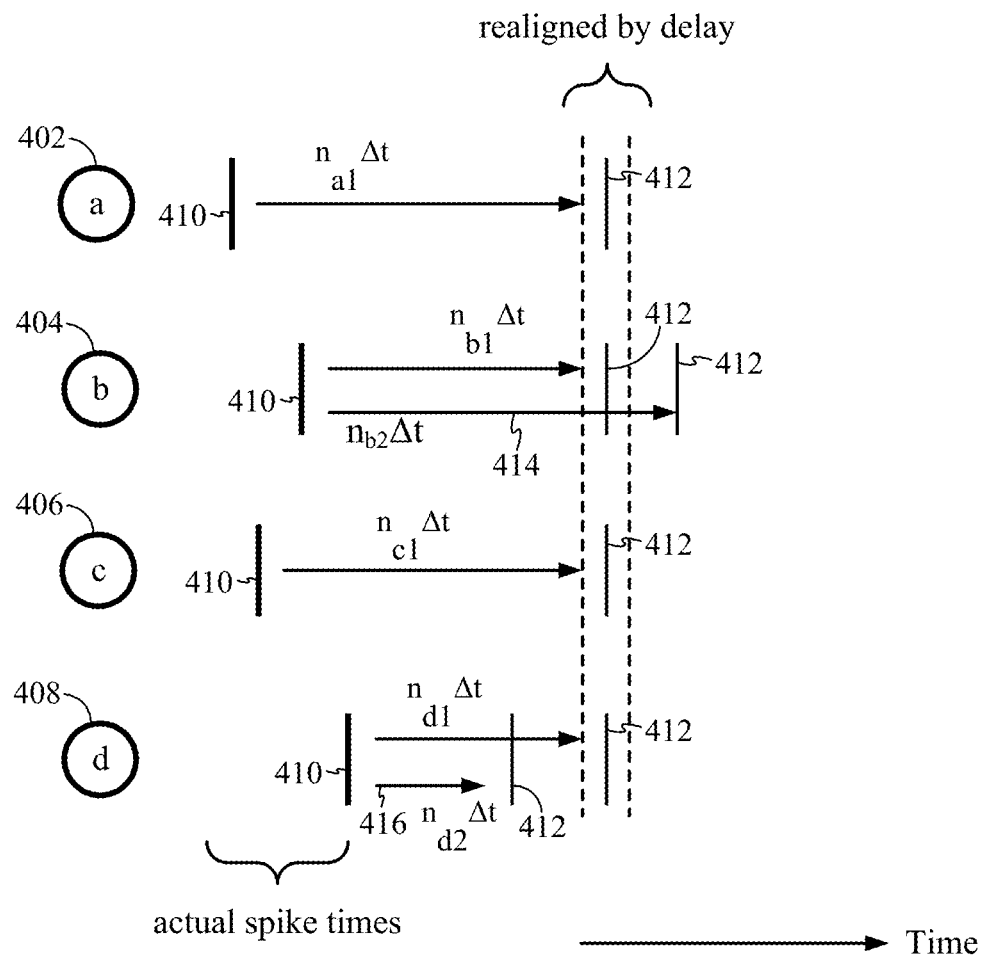
FIG. 4 illustrates an example realignment of relative delay inputs by dendritic model in accordance with certain aspects of the present disclosure.

Using this method, a neuron may recognize spatial-temporal patterns in outputs of input neurons (spatial in the sense of input neurons, temporal in the sense of relative spike timing or temporal differences between spikes). This is illustrated in FIG. 4 where input neurons 402, 404, 406, 408 may spike at different times. However, because of delays in the dendrite(s), signals from the input neurons may reach a soma of output neuron x aligned in time. An input to the output neuron x at time t may thus be expressed as a function of delayed outputs of the input neurons, i.e.:

$$u_x(t) = \sum_j w_j v_{i_j}(t - n_j \Delta t), \quad (1)$$

where j is the synapse index, $i_j$ is the input neuron to which synapse j connects, $n_j$ is the synaptic delay in units of $\Delta t$, $v_i(t)$ is the output of input neuron i, and $w_j$ is a synaptic weight. In equation (1), the synaptic delay represents a delay by which a total delay is abstracted. That total delay may be due to one or more (combination of) actual synaptic delays due to a digital-to-analog delay (i.e., a time for conversion from action potential (AP) to post-synaptic potential (PSP)), a dentritic delay (i.e., a passive travel time for the PSP to reach a soma), or other delays (e.g., axonal delays or network architecture delays due to paths through different layers or number of neurons).

Actual timings of firing of the neurons 402, 404, 406, 408 are labeled as 410 in FIG. 4. Because of particular delays corresponding to synapses (denoted by multiples of time delay resolution $\Delta t$), the input timings after delays may or may not align once the relative delays are accounted for (labeled as 412 in FIG. 4). It can be observed from FIG. 4 that some synapses are associated with delays that are too long (e.g., a synapse with delay 414) or short (e.g., a synapse with delay 416) to coincide with delays of other synapses. In an aspect, these short and long delays may be discarded from or not added to a recognized pattern, while delays that result in coincident delayed spikes may be retained or added to correspond to a recognized pattern.

In the preferred aspect of the present disclosure, discrete time delays of integer milliseconds may be utilized (i.e., delays in multiples of time delay resolution $\Delta t = 1$ ms). However, in general, any discrete or continuous resolution may be used. In the discrete model, the delay may be represented by the integer $n_{x,i}$, where x is the input neuron (e.g., the neuron 402 in FIG. 4), and i is the synapse index for that input neuron since there may be one or more synapses to each input.

Figure 5:
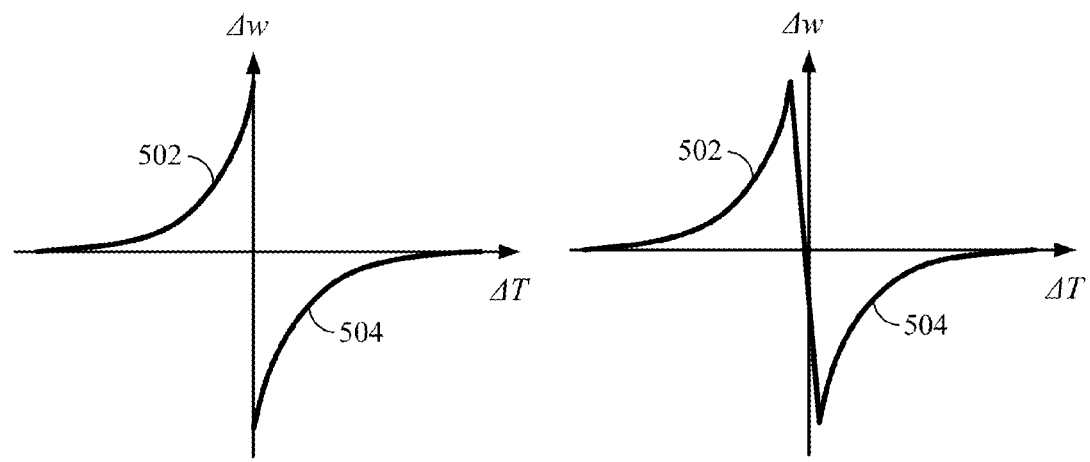
FIG. 5 illustrates an example of typical spike-timing-dependent plasticity (STDP) learning curves in accordance with certain aspects of the present disclosure.

Evidence of spike-timing-dependent plasticity (STDP) can be experimentally measured and reported. Typical depictions of such learning relations are illustrated in FIG. 5 with a curve 502 of long-term potentiation (LTP) and a curve 504 of long-term depression (LTD). Typically, the x-axis indicates the time difference between input and output (causal being for the curve 502, and non-causal being for the curve 504). It should be noted that the proposed method may induce delays in the dendrites. Thus, the x-axis may be considered in learning curves as the delay between the neuron firing and the re-aligned inputs. In the present disclosure, $\Delta T$ may be defined as the time of neuron firing minus the time of a given input arriving at the neuron's soma. This should be distinguished from the time taken for the signal to travel the delay line from synapse to soma ($n_1 \cdot \Delta t$).

Figure 6:
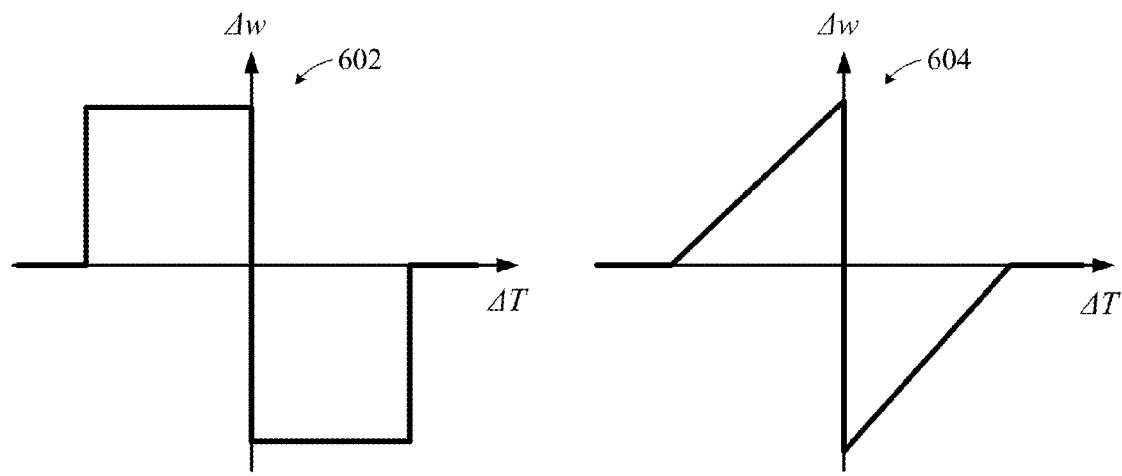
FIG. 6 illustrates an example of variations on temporal-sensitivity of STDP learning curves in accordance with certain aspects of the present disclosure.
Figure 7:
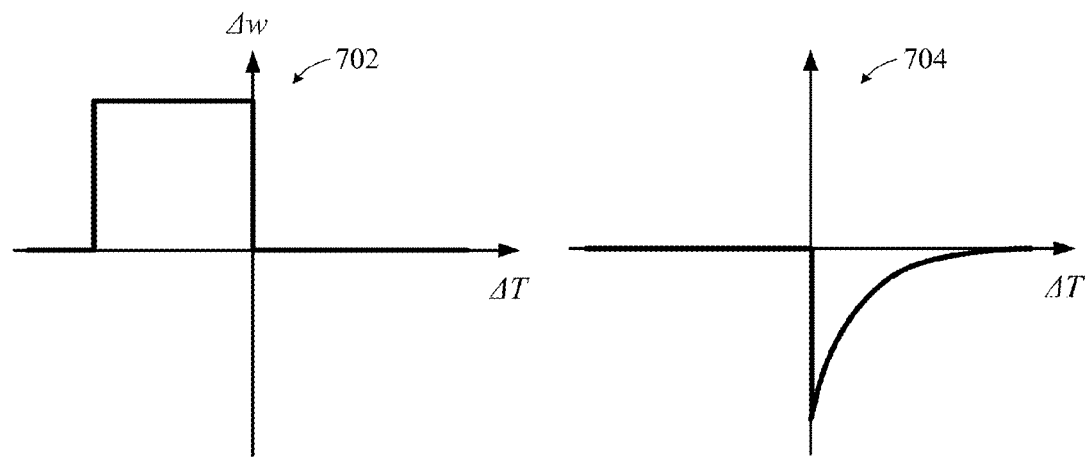
FIG. 7 illustrates example variations on re-enforcement/de-emphasis balance of STDP learning curves in accordance with certain aspects of the present disclosure.

Moreover, a variety of variations to reflect varying sensitivity to time differences can be proposed, as well as purely reinforcing or de-emphasizing relations, scaling and variations upon these. It should be noted that, in general, the horizontal extensions in the causal and non-causal directions may not necessarily be the same. Similarly, the peak negative and positive magnitudes may differ to emphasize/de-emphasize learning unequally. FIG. 6 illustrates examples 602, 604 of variation in sensitivity to time difference in accordance with certain aspects of the present disclosure. FIG. 7 illustrates an example 702 of purely reinforcing and an example 704 of purely deemphasizing in accordance with certain aspects of the present disclosure.

Controls for Spatial-Temporal Pattern Matching

In order for a neuron to be able to recognize a temporal spike pattern of a given duration, a set of synapses may need to have non-zero (or non-negligible) weights with a span of dendritic delays corresponding to the pattern duration. Thus, several factors may be relevant to determining resolvable pattern duration (time window span), size (spikes in the window) and the resolvable timing precision. According to certain aspects of the present disclosure, these factors may comprise at least one of: dendrite length (maximum delay), compartment memory (time constant of membranes in a dendrite or soma), pre-synaptic membrane responsiveness (time constant of filtering effects pre-synaptic; determining AP breadth), time constants of synaptic conductances, or functional operation within dendrite (e.g., logical OR versus logical AND).

It should be noted that a longer time constant may reduce temporal resolution because the low-pass filtering effect of a membrane may reduce the differentiation of spike response at different delays, yet allow a longer pattern to be considered. In other words, different neurons may be configured with different time scales or a given neuron's time scale may be changed, or different neuronal arrays may operate at different (possibly overlapping) time scales. Moreover, resolvable pattern complexity (in addition to duration) may also be limited by the following factors: number of synapses (given same weight, threshold), weight distribution (given same threshold, number of synapses), threshold (and resting level relatively) (given same number of synapses, weight).

According to certain aspects of the present disclosure, a balance can be important because, given a limitation in one or more of the above, a pattern may have too few spikes for the neuron to fire (crossing the threshold) or too many spikes for an individual neuron to distinguish a specific pattern from variations. Such aspects are demonstrated in FIG. 8, which comprises the weights of each synapse.

Figure 8:
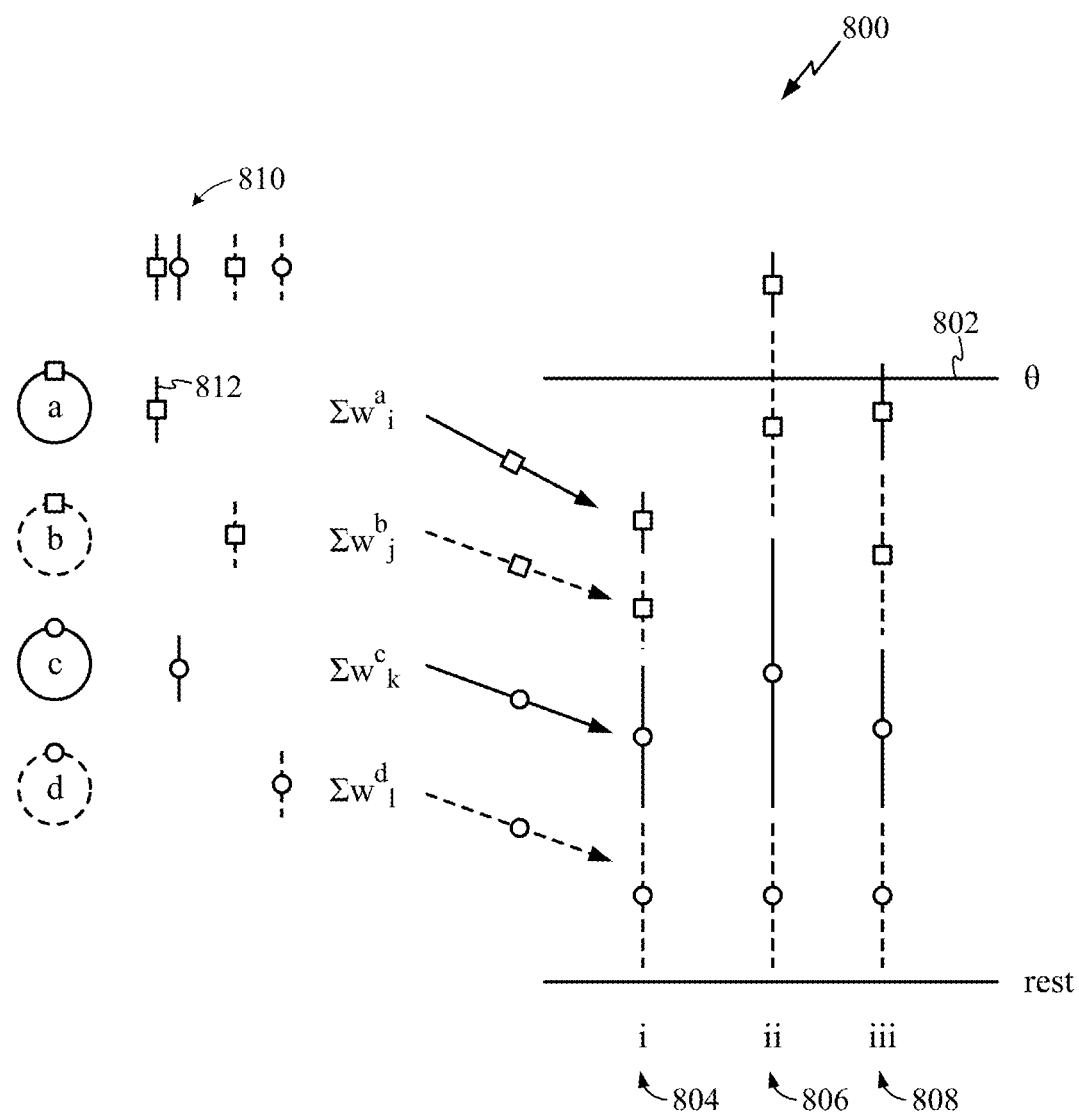
FIG. 8 illustrates an example of precision and robustness of neuron response to temporal input pattern in accordance with certain aspects of the present disclosure.

In order to exceed a firing threshold 802, the combined coincident input may be required to exceed the threshold (relative to resting potential). The contribution of weights, threshold, and number of synapses is depicted in FIG. 8. In case 804, there may be too few coincident synapses (or too few weights or the threshold 804 may be too high). In case 806, the opposite is may be true. Only in case 808 the match may be perfect. The case 806 may be considered either loose (redundant) or robust depending on perspective, depending on the context or noise level. Similarly, the case 808 might be considered perfect (precise or efficient) or sensitive (brittle, non-robust).

It should be noted that for a given firing, the total contribution of a single input neuron may be determined by the total of the synapses with coincident delay (not merely relative to one another but relative to the combination with other inputs) and their weights. If the total coincident input across input neurons for those synapses is below the threshold, firing may not occur. If the total coincident input across input neurons for those synapses is above threshold, then the firing may occur. This may be problematic because if, as depicted as the case 806 in FIG. 8, some parts of the pattern 810 may not be required for firing, such as input a's pattern (i.e., the pattern 812).

Methods for resolving this issue may comprise neuronal regulation, i.e., controlling or normalizing the total contribution of contributing inputs, in terms of number, weight, firing frequency or otherwise.

Synaptic Turnover

According to certain aspects of the present disclosure, synapse turnover may also be important to resolve issues described above. In fact, the synapse turnover may be required to resolve the above issues if the number of synapses or weights are restricted (or both). The synapse turnover may comprise reusing a synapse resource for a different time delay or different input. This may be critical if resources are limited or connections are limited.

Since the location of the synapse on a dendrite may implicitly encode spike timing, if a specific synapse location (hence relative latency) is occupied by a particularly input a, then the same dendritic latency may not be used by a different input b on the same dendrite. But, if the input b were to use the same relative latency, it may need to make use of a synapse (with matching the relative latency) on a different dendrite. As a result, it may be required an economy of the number of synapses used to represent a specific spike pattern and the related efficiency in reusing synapses (relative latencies) that have little or no correlations with the specific inputs such that the same latency can be utilized by other inputs. In the model used in the present disclosure, dendrites may be abstracted so that there is no limitation in this manner. However, there may be motivation to limit the total number of synapses and to re-use resources. This may relate to hardware or software resources as well as neuronal regulation.

Figure 9:
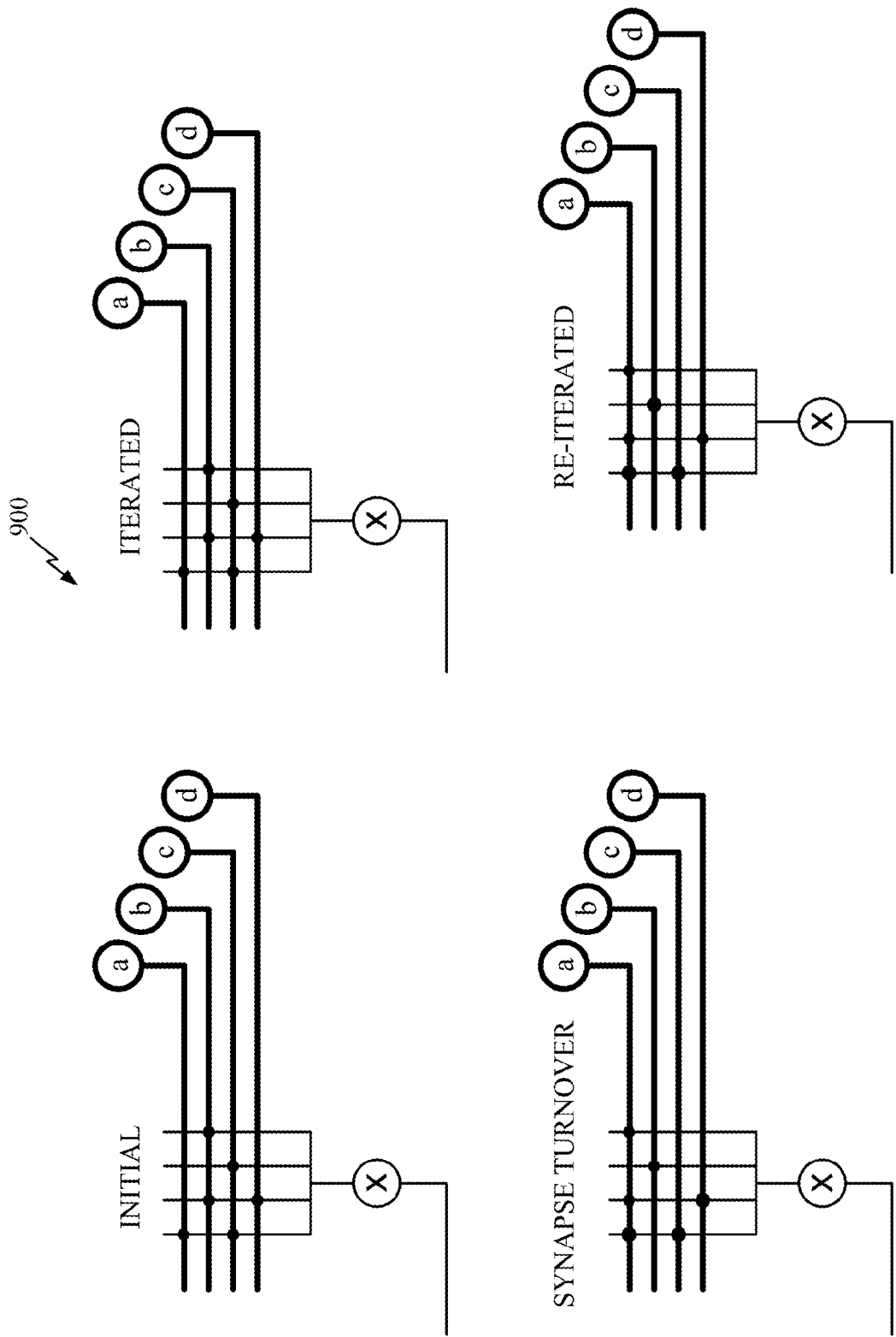
FIG. 9 illustrates an example synaptic turnover in accordance with certain aspects of the present disclosure.

The synaptic turnover aspect, in the context of the system, is illustrated in FIG. 9. It should be noted that the process of synaptic turnover may be efficiently executed periodically (not every time step of the dynamic spiking model or delay-line resolution) between one or more iterations of the other aspects of the model. It can be supposed that a neuron x in FIG. 9 is initialized with random or uniform weights on random inputs with random delays, as illustrated in FIG. 9. As the model is iterated, the learning mechanism may tend to increase some weights and decrease others. In the proposed model, whether by learning curve or by Hebbian rule, this may tend to bring the weights to zero or their maximum (or some normalized maximum). However, this may not be generally the case. The synapses that have weights near zero (a low threshold is used) may be recycled by synapse turnover, obtaining at least one of: a new delay, a new input, or a new weight. Each of these may be either randomly or deterministically determined, and may be limited (e.g., a number of synapses per input or a range of weight value). Then, the system may continue iterating other aspects including learning, and the weights may adapt further.

It should be noted that, generally, a new synapse may be allowed a "trial-period" during which it may not be re-cycled even if its' weight falls below the threshold.

After iterating the learning method, weights may decay or grow. If the number of synapses is limited (for which there is motivation) and the weights are limited (for which there is also motivation—for neuronal regulation), pattern recognition capability may be limited unless some of the lower (or relatively negligible) weight synapses are reused. Synaptic turnover may comprise re-configuring a synapse with a different delay and/or weight and/or connectivity (different input neuron). By doing this, the neuron's synaptic pattern may evolve toward a critical mass for a particular input pattern (i.e., requiring a particular number of synapses to correspond to a particular number of spikes in the pattern). Then, if this sequence of turnover and re-iteration is repeated, then the weights may be learned progressively to improve the match to pattern(s).

Bootstrapping Neuronal Learning

It should be noted that with STDP or other Hebbian-learning mechanisms, learning may require firing. A neuron that does not fire, does not learn. Certain methods are proposed in the present disclosure to help ensure that learning starts effectively without limiting a neural network in other ways. A neuron may be ensured to fire by configuring at least one of: large weights, large number of synapses, longer time constants, low threshold (high relative resting state), less inhibition at first, or larger input noise.

Figure 10:
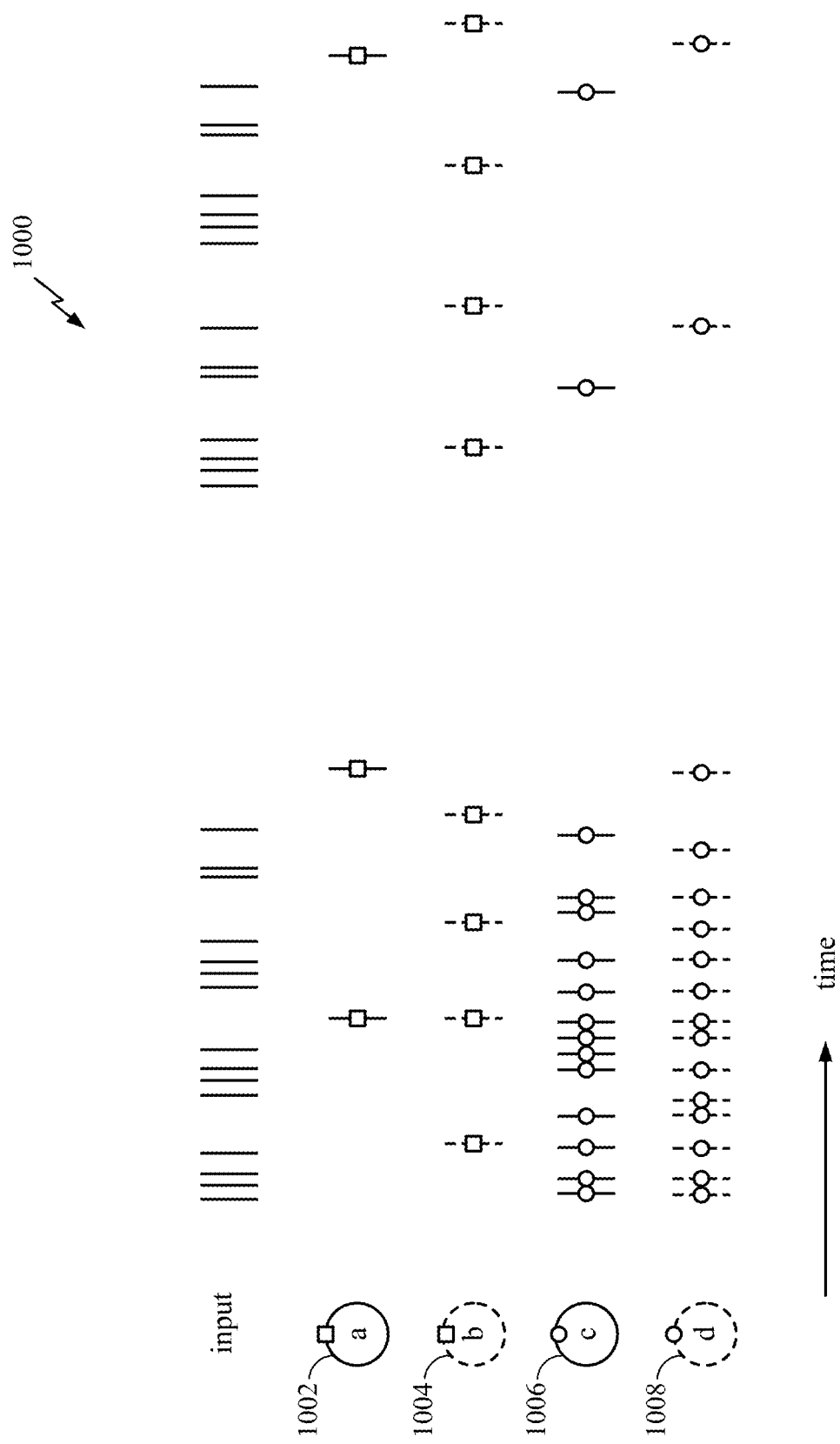
FIG. 10 illustrates example effects of firing rate on temporal pattern learning in accordance with certain aspects of the present disclosure.

Thus, in one aspect, for a neuron to start firing, oscillation may be utilized at an input of the neuron. In another aspect, synaptic weights associated with the neuron may be set high. In yet another aspect, a number of synapses may be set high. FIG. 10 illustrates an example 1000 on how neurons that are initially more excitable may learn much faster because they fire more and thus have their weights adjusted faster. For example, in the example 1000, a neuron 1002 may fire rarely. This neuron may act more as a spike counter than temporal pattern recognizer. Since it fires so rarely, it may have little chance to learn weights for a temporal code. Similarly, a neuron 1004 may appear to be merely a spike counter of fewer spikes (e.g., four spikes). The neuron 1004 may adapt, but this may be a slow process because it may only fires once per four-spike pattern.

In contrast, neurons 1006, 1008 may initially fire very rapidly and do not appear capable of recognizing a temporal pattern. However, exactly the opposite may be true. Because these neurons may fire so often, their weights may rapidly adapt and, depending on the history, may lock onto different patterns, as illustrated in FIG. 10. As the weights adapt, the firing rate may slow down and lock onto a particular time window/delay. If this process occurs smoothly, these neurons may learn temporal codes much better/faster than slow firing neurons. Then, when those patterns re-appear later on, these neurons may respond well to match different patterns or different parts of patterns.

There may be a further temporal benefit to this approach. Neurons may initially fire at a high rate, causing lateral inhibition across broad time windows. Then, the neurons may begin to diversify, hinging on different input combinations and neuronal regulation. After that, the neurons may start to slow their firing rates and thus may become more sensitive to finer delays and learning delay offsets. In an aspect, the neurons may fire at offset times and lateral inhibition may reduce across time delays. Now, neurons with similar but different patterns may increase firing rate and refining the diversity.

Transitions between activity levels may be crucial for diversifying. This may be because neurons with slow firing may reduce their inhibitory effect on others. Further, neurons that receive less inhibition may increase their firing rate and inhibitory effect. According to above, activity level may affect temporal learning capability, so in combination with varying firing rates, learning may proceed in an efficient distributed fashion of combinatorial exploration, varying between low to high temporal sensitivity in a series of stages until convergence. In an aspect, memory capability of a network may depend on inhibition as well as connectivity and individual neuronal aspects, and may occur in an efficient distributed multi-staged process.

Simulated Annealing

By reducing the rate of weight adjustment based on firing count (history of activity), a neuron's learning rate may be "cooled" so that it may congeal once a pattern is learned. This may be particularly useful in temporal coding because of the issues described above. For example, the use of STDP or other rules may tend to try to shift pattern windows until they overlap and may be thus redundant. If weights "cool", this may be avoided.

Finally, it should be noted that although it is not critical for the dendritic processing to be all integrative (logical AND), there should be some component of addition, above threshold, for the temporal system to function. In other words, it may be possible to model dendrites alone as logical OR operations, as long as there may be an integrative component across dendrites or at the soma.

Figure 11:
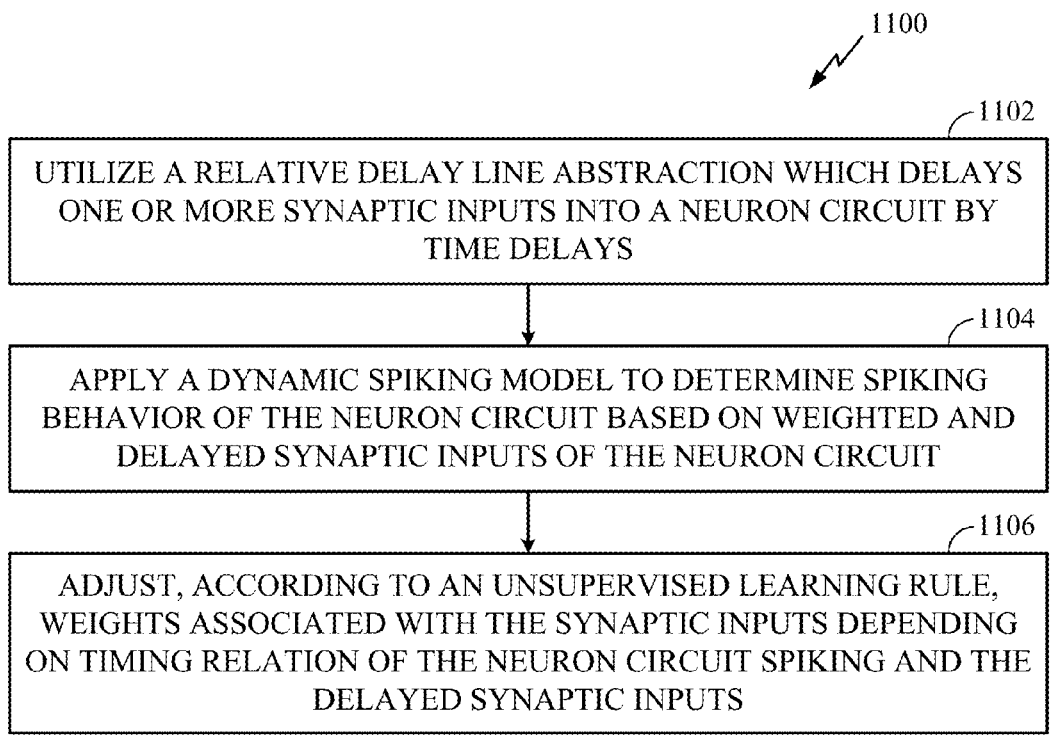
FIG. 11 illustrates example operations that may be performed by a neuron circuit of a neural network for neural temporal coding in accordance with certain aspects of the present disclosure.
Figure 11A:
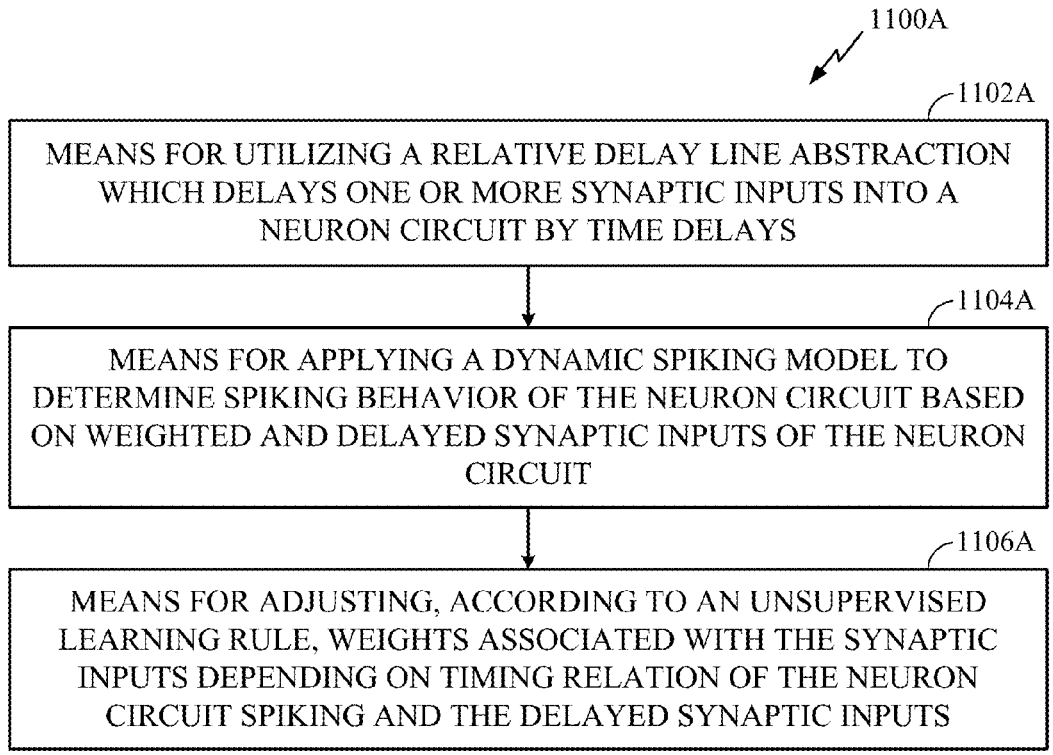
FIG. 11A illustrates example components capable of performing the operations illustrated in FIG. 11.

FIG. 11 illustrates example operations 1100 that may be performed by a neuron circuit of a neural network for neural temporal coding in accordance with certain aspects of the present disclosure. At 1102, a relative delay line abstraction may be utilized, which may delay one or more synaptic inputs into the neuron circuit by time delays. At 1104, a dynamic spiking model may be applied to determine spiking behavior of the neuron circuit based on weighted and delayed synaptic inputs of the neuron circuit. At 1106, weights associated with the synaptic inputs may be adjusted according to an unsupervised learning rule depending on timing relation of the neuron circuit spiking and the delayed synaptic inputs.

In an aspect of the present disclosure, at least one of: the weights, a number of synapses associated with the neuron circuit, time constants of the synapses, a firing threshold of the neuron circuit, a degree of inhibition of the neuron circuit, or a noise associated with the neuron circuit may be controlled to induce initial firing rates of the neuron circuit. Further, simulated annealing may be applied by the unsupervised learning rule for the adjustment of weights.

In an aspect of the present disclosure, a reusable synapse associated with the neuron circuit may be selected, and at least one of a weight, a delay, or an afferent of the reusable synapse may be modified. Selecting of the reusable synapse may be based on a weight of the reusable synapse being reduced by the unsupervised learning rule to a value below a threshold. Further, selecting the reusable synapse may be conditioned upon a time elapsed since the synapse was reused.

Method of Neural Coding of Large or Long Spatial-Temporal Patterns

Figure 12:
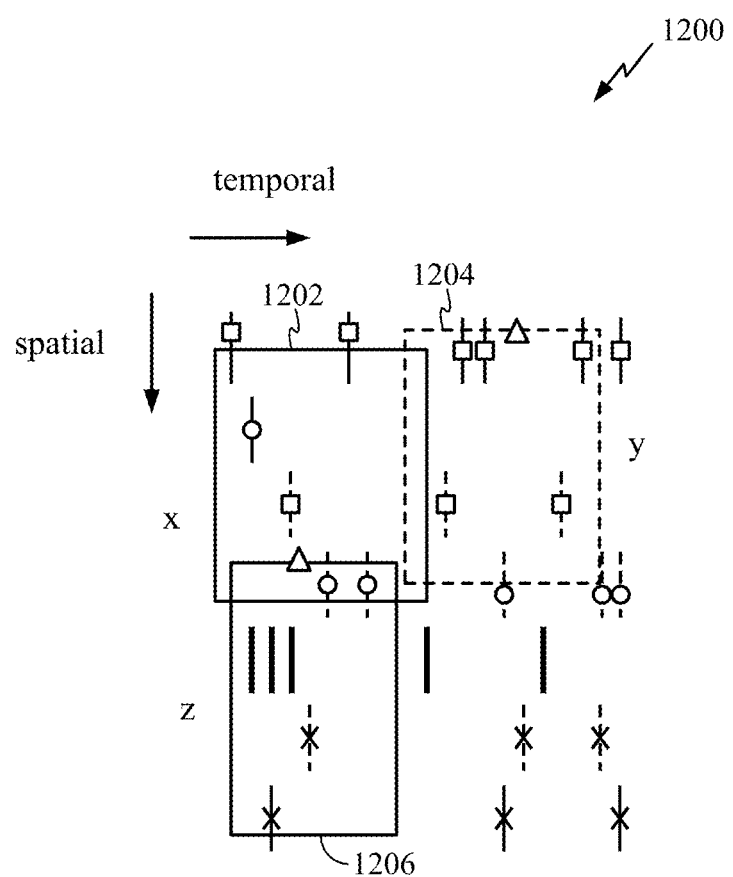
FIG. 12 illustrates an example of long large spatial-temporal pattern in accordance with certain aspects of the present disclosure.

The proposed temporal pattern method can be utilized to design a neuron capable of temporal pattern matching a given duration and size (number of inputs) of a pattern. However, it may be further desired to match a larger pattern. FIG. 12 illustrates a plot 1200 of bars indicating inputs (spikes). A vertical position of a spike indicates an input index or spatial dimension, wherein the horizontal direction represents time. As illustrated in FIG. 12, there may be three pattern matching neurons, x, y and z which may be able to recognize the spatial-temporal parts of the overall pattern indicated by corresponding boxes 1202, 1204, 1206. Each of the pattern matching neurons may consider inputs at a different space-time frame, which may overlap.

The present disclosure proposes a solution on how to recognize the entire pattern when it occurs. This may need to be performed efficiently (i.e., without too many neuron layers). Further, the proposed solution may be able to prevent falsely recognizing a pattern that comprises parts re-ordered or interchanged from the desired pattern.

Individual neurons may have limited (or controlled) capabilities in terms of spatial (number of input neurons or synapses considered) or temporal pattern resolvability (e.g., precision or window) as described above. However, learning and recognition of longer temporal patterns or larger spatial patterns (or both) may be achieved using multiple neurons or multiple layers of neurons.

Network for Coding Longer and Larger Spatial-Temporal Patterns

Figure 13:
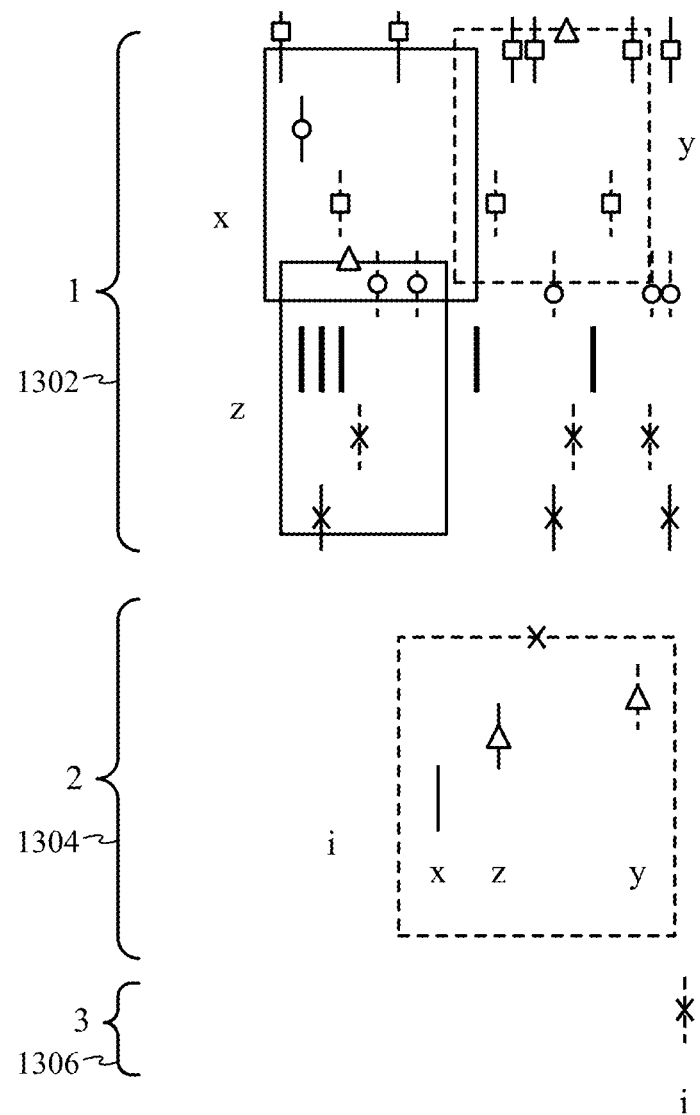
FIG. 13 illustrates an example of multi-layer network for longer and/or larger spatial-temporal pattern coding in accordance with certain aspects of the present disclosure.

In the example 1200 illustrated in FIG. 12, most of the complete pattern may be matched if the neurons x, y and z all fire. However, in a spatial-temporal framework, this may require not only combining the outputs spatially but also combining them temporally. Thus, a next-layer neuron i may have coincident delays, as illustrated in FIG. 13. In FIG. 13, three layers 1302, 1304, 1306 are illustrated with inputs at the layer 1302, the small-pattern neurons x, y, z at the layer 1304, and the long/large pattern neuron i at the layer 1306. It can be observed from FIG. 13 that the outputs of both layers 1304 and 1306 may form spatial-temporal patterns. The neuron i of the layer 1306 may comprise weights and delays for synapses that match the x, y, z neuron spike pattern. In the example illustrated in FIG. 13, the neuron i may combine results over adjacent time windows (of x/z and of y), but this may be merely an example since this structural building block can be assembled into a hierarchical network architecture where subsequent layers encode/decode/respond to ever longer or larger spatial temporal patterns.

However, it may not be necessary to add more and more layers to recognize/decode longer and longer temporal patterns because individual neuron's time windows can be controlled as described above (and thus network time windows can be controlled).

Scalable Spatial-Temporal Network Solutions

Figure 14:
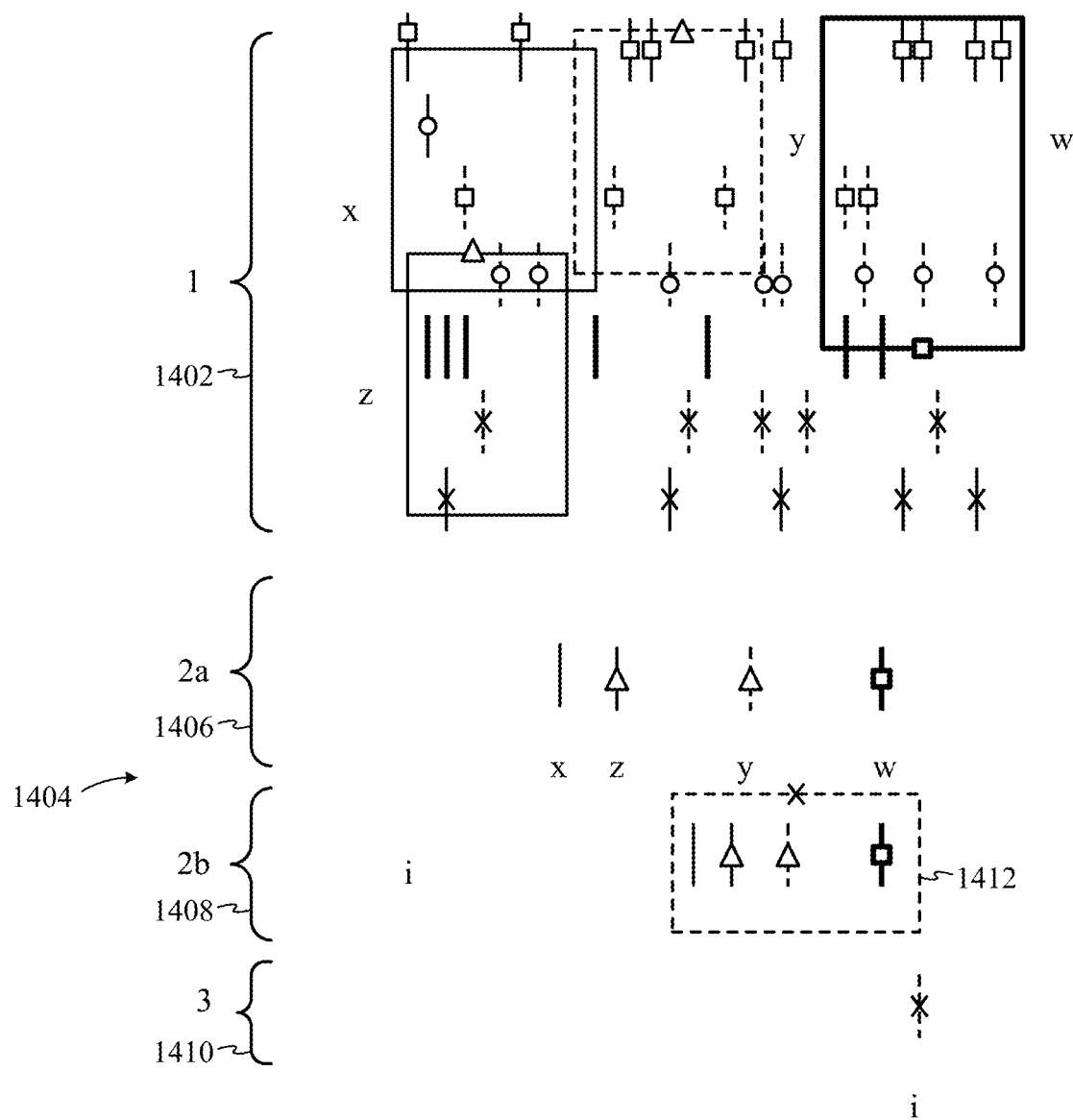
FIG. 14 illustrates an example of multi-layer network for longer spatial-temporal pattern coding with axonal delay in accordance with certain aspects of the present disclosure.

Moreover, in combination with axonal delays or network architectural (different path) delays, longer patterns may also be matched with few layers. This can be demonstrated in FIG. 14. Neurons w, x, y, and z of a layer 1404 may recognize sub-patterns of the spatial-temporal pattern in afferents of a layer 1402. The firing time of layer 1404 (action potential (AP) origination time) is indicated in a layer 1406. However, it may take some time for the APs to propagate along their respective axons and reach the synapse(s) on neuron i, which is in a layer 1410. Moreover, depending on the axon cable properties (length, conductance, membrane conductance, etc), this may take different amounts of time depending on the neuron. In this case, the neurons x, y, and z may have a longer axonal distance (or slower speed (thinner myelin), or larger hop network path), from soma to pre-synaptic point at a synaptic junction with neuron i, than the neuron w does. The AP timing at the pre-synaptic point is illustrated in a layer 1408. The timing at this point may be within a time window 1412 that neuron i can resolve (i.e., they are much closer in time than at their origins). The neuron i may recognize this pattern and thus the entire pattern of layer 1402, and it may fire accordingly. Effectively, the axonal delay has compressed the pattern recognition of an arbitrarily long pattern into a window for neuron i to recognize.

Figure 15:
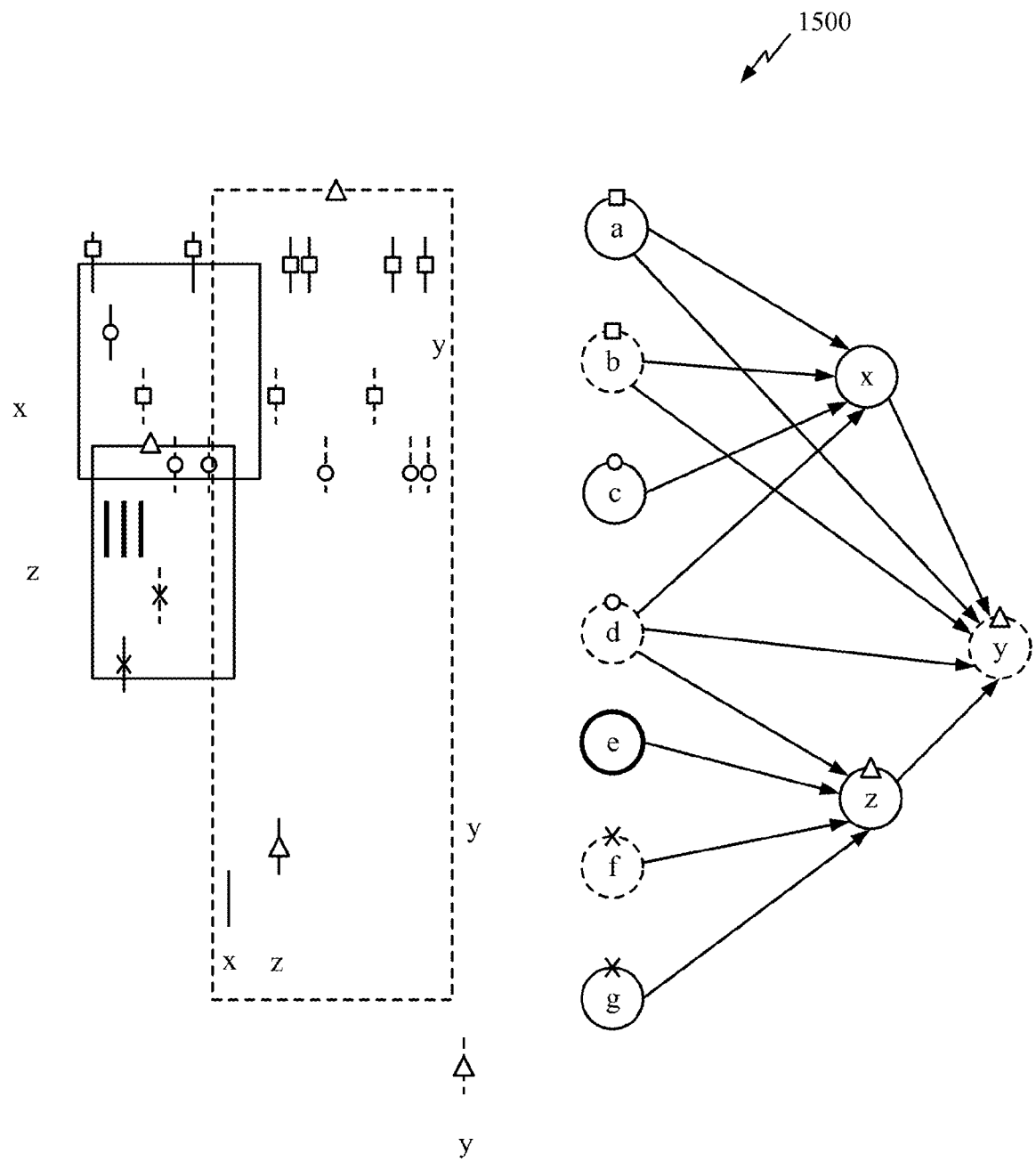
FIG. 15 illustrates an example scalable network for longer and/or larger spatial-temporal pattern coding in accordance with certain aspects of the present disclosure.

Another method to scale temporal pattern capability can be implemented with recurrent connections or self-recurrent connections. A neuron or a plurality of neurons may be connected so that a partial pattern match can be fed into a neuron that matches a subsequent part of the pattern in combination with the earlier part, as illustrated in FIG. 15.

This concept can be extended in several ways. In one aspect of the present disclosure, neurons may be added to learn longer patterns. In another aspect, neurons may compile adjacent or non-adjacent pattern parts. In yet another aspect, neurons may recognize different parts of the pattern with different precision or generality, or have different sensitivities depending on how critical a part of the pattern is, or how variable the input may be in that part of the pattern (either spatially or temporally).

It should be noted that biologically, axonal delay for a pre-synaptic neuron may be typically characterized as equal for all the synapses with that neuron (i.e., a common axonal delay). While this may be a useful mechanism for alignment/compression as described above, the methods proposed in the present disclosure may not strictly require this as the delay processing aspects may be abstracted. Whether a first neuron inputs to a next-layer neuron with different dendritic delays or two neurons with exactly the same processing but different axonal delays input to the next layer neuron, from a computational view-point, an equivalent delay representation may be modeled.

Super-Scalable/Recursive Temporal Pattern Coding

Figure 16:
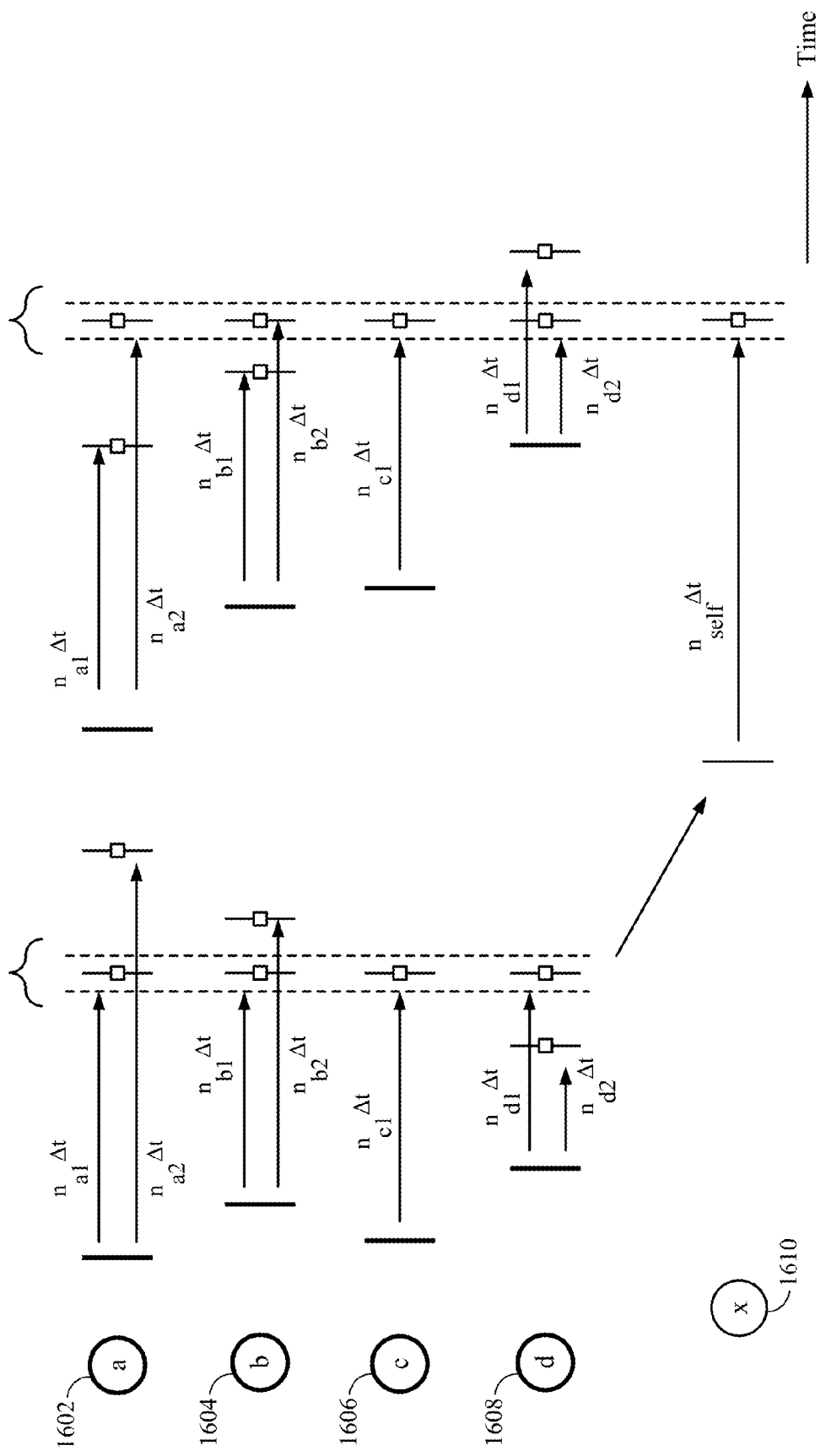
FIG. 16 illustrates an example recursive scalable spatial-temporal pattern coding in accordance with certain aspects of the present disclosure.

Moreover, even longer temporal pattern matching may be achieved using a single neuron. It should be noted that a single neuron may be configured to recognize multiple patterns. This may be possible because different synapses may be coincident depending on the input pattern (part). In FIG. 16, two parts of a pattern from the same four input neurons 1602, 1604, 1606, 1608 are illustrated. It should be noted that for the first part (half), some delays may cause coincident alignment while others may not. However, it may be the other delays (synapses) that align in the second part (half) of the pattern. If the weights (and number) of synapses are such that a neuron 1610 fires upon recognizing the first part of the pattern, then this may be fed back to itself (also with a delay) and used to match with the second part of the pattern. Of course, this may be generalized to any length of pattern. Therefore, that one-single recurrent neuron 1610 may recognize long patterns and/or large spatial patterns.

In addition to having the mechanisms to code such larger or longer temporal patterns, network learning methods are further proposed that may divide the task of temporal pattern coding among multiple neurons efficiently.

Methods for Differentiation in Learning Spatial-Temporal Patterns

Different patterns may be recognized with different neurons. In unsupervised training, it may be desirable for neurons to autonomously learn/select different patterns. However, spike-timing-dependent plasticity (STDP), as typically represented, may prevent neurons from differentiating. This may be also important in learning longer patterns using individual neurons for different parts. If there is no differentiation (among parts), then total pattern correspondence (match/learn) may be prevented.

The reason STDP can be problematic is because it may cause temporal drift such that whatever portion of a pattern a neuron starts learning, the neuron may shift toward the earliest part of the pattern. Several methods can be proposed to resolve this issue, such as divisive normalization (output inhibition) or lateral inhibition (i.e., winner-take-all).

Figure 17:
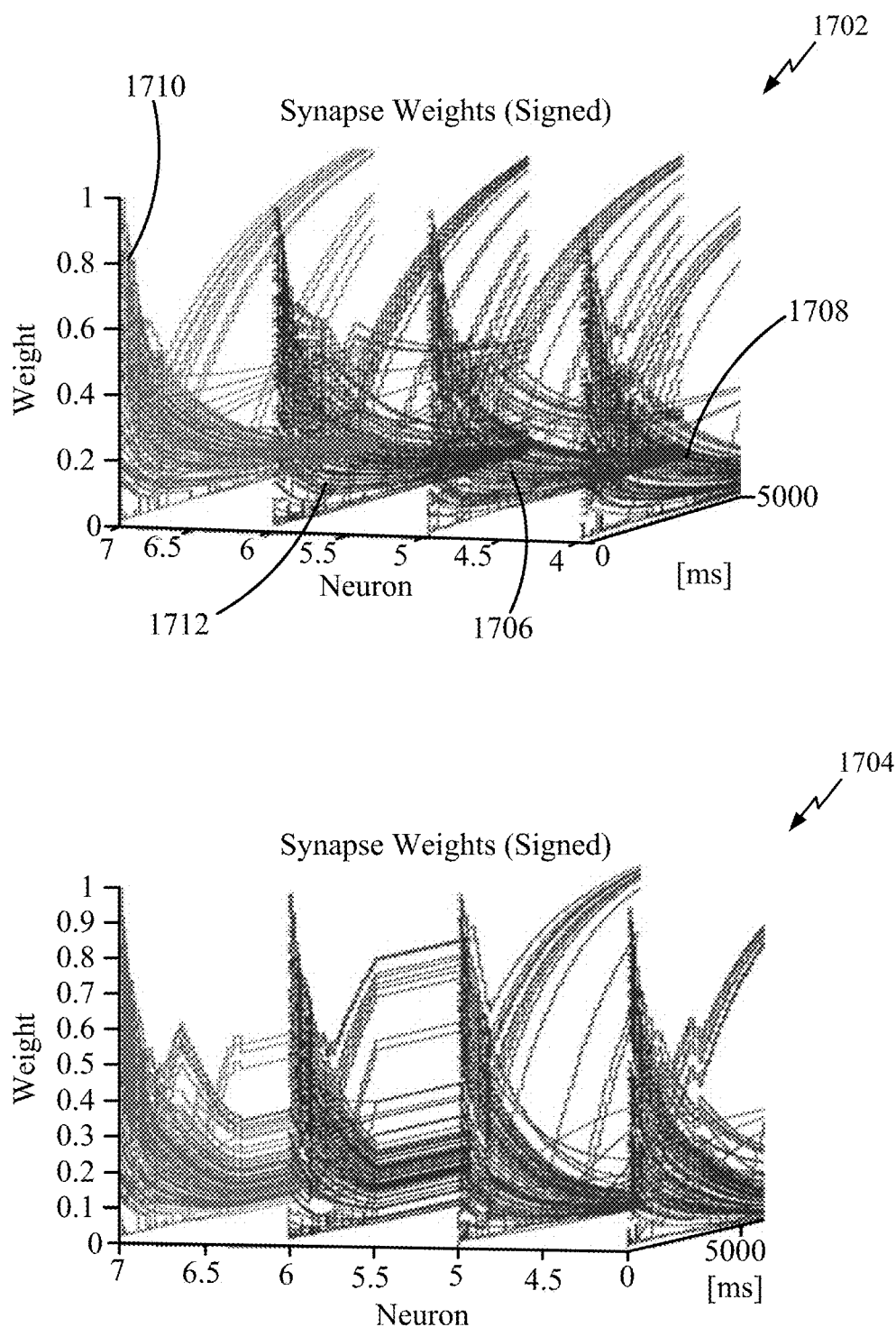
FIG. 17 illustrates example graphs of adaptation of weights at each neuron in accordance with certain aspects of the present disclosure.

Lateral inhibition or winner-take-all may improve diversification by introducing competition among temporal patterns, favoring neurons that fire at different time, thus potentially spreading out pattern coverage. The impact of lateral inhibition can be noted in FIG. 17. Plots 1702, 1704 represent adaptation of weights at each neuron with and without lateral inhibition, respectively.

Consistent with observed STDP effects, weights may tend to poles (bipolar weights), either growing to a maximum or shrinking to near zero. In the plot 1702, without lateral inhibition, all the neurons may learn the same pattern (inefficient and limited). In the plot 1704, with lateral inhibition, neurons 1706, 1708 may learn different parts of the pattern while neurons 1710, 1712 may remain unused (free memory).

Figure 18:
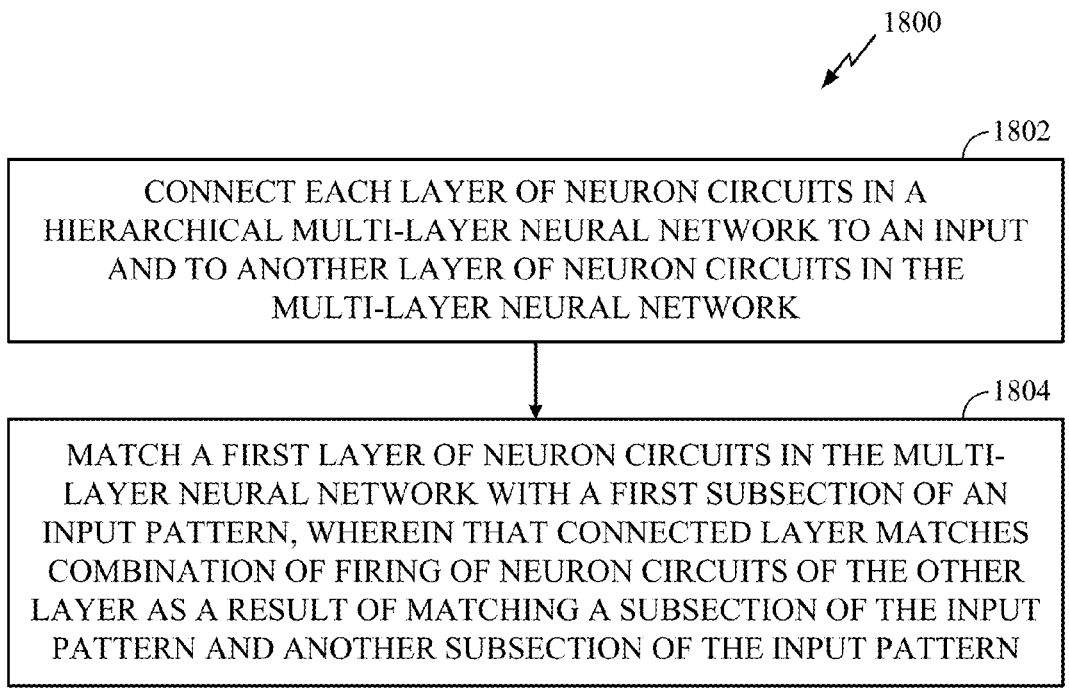
FIG. 18 illustrates example operations that may be performed at a multi-layer neural network for neural temporal coding of long and large spatial-temporal patterns in accordance with certain aspects of the present disclosure.
Figure 18A:
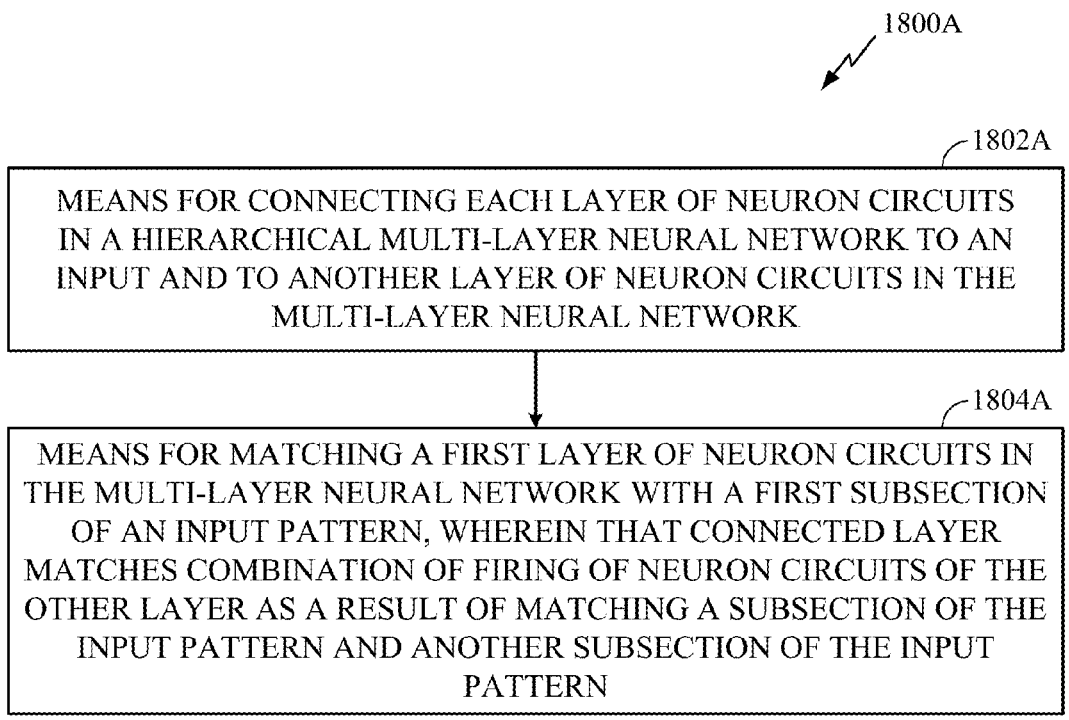
FIG. 18A illustrates example components capable of performing the operations illustrated in FIG. 18.

FIG. 18 illustrates example operations 1800 that may be performed at a multi-layer neural network for neural temporal coding of long and large spatial-temporal patterns in accordance with certain aspects of the present disclosure. At 1802, each layer of neuron circuits in a hierarchical multi-layer neural network may be connected to an input and to another layer of neuron circuits in the multi-layer neural network. At 1804, a first layer of neuron circuits in the multi-layer neural network may be matched with a first subsection of an input pattern, wherein that connected layer may match combination of firing of neuron circuits of the other layer as a result of matching a subsection of the input pattern and another subsection of the input pattern. In an aspect, the other subsection of input pattern may be consecutive to the subsection of input pattern.

According to certain aspects of the present disclosure, the first layer may comprise a network of recurrent neuron circuits excited by the first subsection of input pattern maintaining a memory in temporal code by replaying a polychronous firing wave. Another network of recurrent neuron circuits of the multi-layer neural network may be excited by combination of a second subsection of the input pattern and the polychronous firing wave. In an aspect of the present disclosure, an axonal delay between layers of the hierarchical multi-layer neural network may delay a response to matching a first part of the input pattern such that the response falls within a window of time corresponding to a second part of the input pattern.

FIG. 19 illustrates example operations 1900 that may be performed at a neuron circuit of a neural network for neural temporal coding of long and large spatial-temporal patterns in accordance with certain aspects of the present disclosure. At 1902, synaptic inputs may be provided, via synapses with associated delays, into the neuron circuit, wherein at least one of the synaptic inputs may be associated with at least one of the synapses being self-connected, the synapses may belong to a plurality of sets, and at least one of the sets may comprise a delay combination to match a first part of a pattern of the synaptic inputs not comprising a recursive self-connection.

According to certain aspects of the present disclosure, at least one other set of the plurality of sets may comprise another delay combination to match a second part of the pattern and the at least one synapse being self-connected having a delay to correlate the first part of pattern with the second part of pattern matching the other delay combination. In an aspect, an axonal delay associated with the at least one synapse being self-connected may delay a response to matching the first part of pattern such that the response may fall within a window of time corresponding to the second part of pattern.

Method of Generalized Neural Coding and Learning

Temporal and Rate Coding

Traditionally, neural communication has been theorized to be coded in the firing (spiking) rates of neurons. However, the importance of spike timing is proposed such that communication might be coded in the temporal coincidence of spikes. Moreover, it is proposed that temporal patterns in spike timing may code information, and a method is proposed by which decoding and learning of such temporal patterns may be accomplished in a biologically plausible way. In the present disclosure, it is further proposed how a single model can encode/decode a spectrum of information coding schemes from firing (spike) rate to spike coincidence to spike temporal patterns and how such a model can dynamically adapt the decoding method across such a spectrum or even simultaneously universally operate on multiple code forms. Moreover, practical methods are proposed that are biologically-inspired/consistent but reduced in computational complexity.

Figure 20:
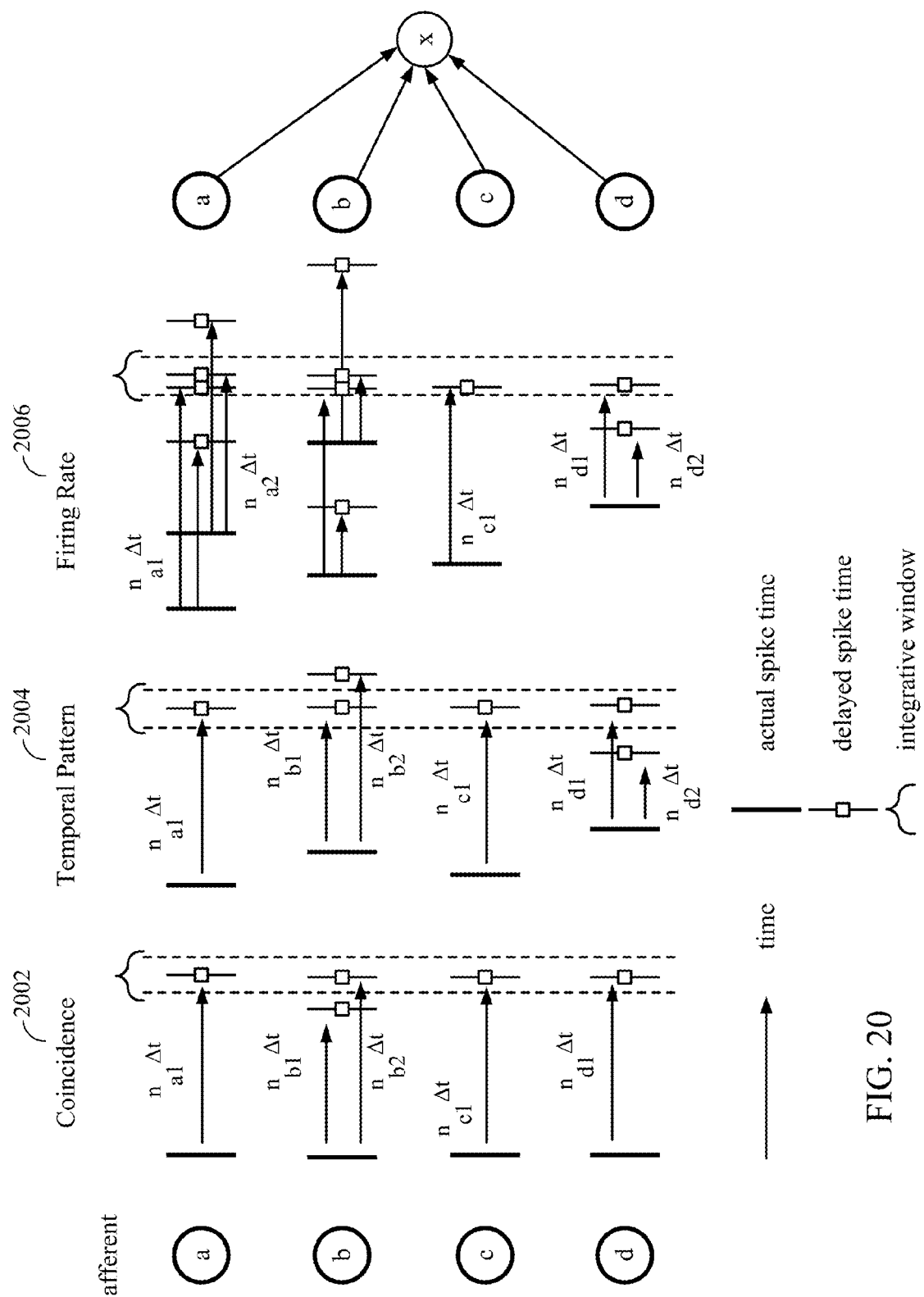
FIG. 20 illustrates an example of decoding different neural coding schemes by aligning spike timing in accordance with certain aspects of the present disclosure.

Universal Neural Coding—Coincidence, Temporal and Firing Rate Combinations—Spectrum of Codes A key advantage of the method proposed in the present disclosure is that information coded in firing rate, spike timing coincidence, or spike spatial-temporal patterns may all be decoded by the same neuron model. In an exemplary case, it can be considered a neuron x with afferents (inputs) from neurons a through d, as illustrated in FIG. 20. Further, it can be supposed that those afferents input information to the neuron x may be coded in the form of either of coincidence, temporal pattern or firing rate (or firing rate combinations). FIG. 20 illustrates three representative examples 2002, 2004, 2006 of decoding such forms, where there may be an arbitrary time resolution denoted by $\Delta t$ and individual connection delays may be denoted by multiples thereof (i.e., the delay $n_{Ai}$ being an integer).

Actual input spike times may be delayed by one or more delays associated with one or more connections to that input. Delayed inputs that arrive in a time window (the integrative window) corresponding roughly to the time constant of neuron x may be combined, potentially depolarizing the neuron and thus causing an output spike (potentially after a delay depending on that depolarization or the activity level or excitability of the neuron).

Coincidence of the input spike timing (the example 2002 in FIG. 20) may be decoded with any delays that are equal (i.e., $n_{ai}=n_{bi}$) or close enough that the resulting delayed spikes may fall within an integration window for the neuron x, such that the combination (integration) of the coinciding delayed afferents may exceed a threshold causing the neuron x to fire with a timing conveying nonzero mutual information associated with the input coincidence. In other words, the fact that neuron x fires and the timing of the output spike of neuron x, may convey information about the coincidence of the inputs. If the neuron x does not fire, this may convey information relating to the insufficiency or lack of input coincidence.

A neuron may comprise multiple connections to an afferent and different delays associated with those connections, as illustrated in the example 2002 in FIG. 20 for the afferent b. It should be noted that it may not be required that all such delays correspond to each other (e.g., the delay $n_{b1}$ in FIG. 20). Also, as illustrated in the example 2004 in FIG. 20, if an insufficient number of the delays are equal, not as many of the coincident actual spikes may align after the delay and thus may cause the neuron x to not spike (or cause it to spike at a different time, e.g., later).

Figure 21:
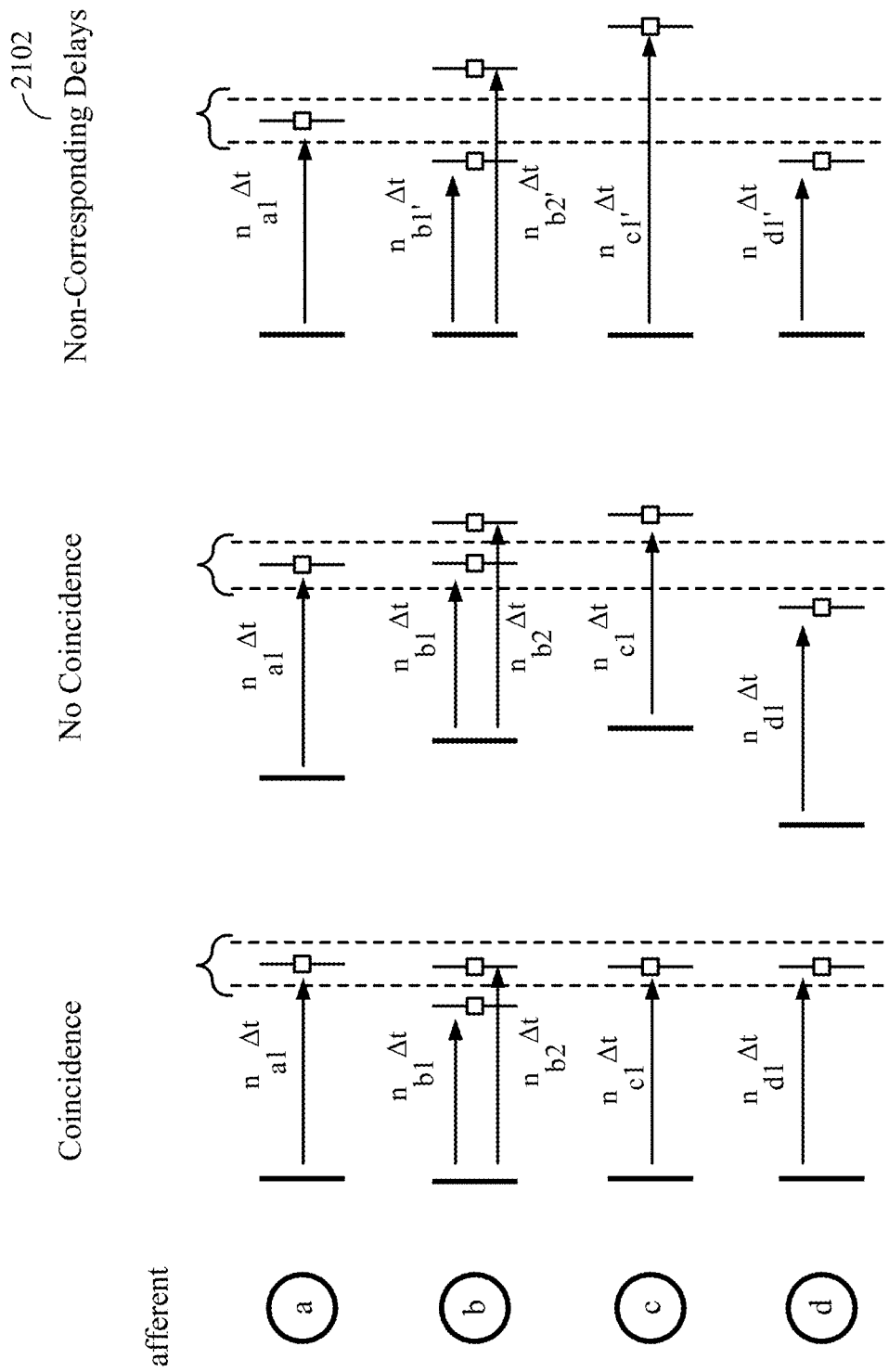
FIG. 21 illustrates an example of coincidence decoding with dependency on relative delays in accordance with certain aspects of the present disclosure.

Moreover, if the delays are configured differently, a coincidence in the inputs may not be recognized by the neuron x (see an example 2102 in FIG. 21). In other words, a neuron may be configured to recognize (fire upon being exposed to) coincidence of inputs or not. To identify the fact that several of the delays (but not all) are different, those delays are indicated by a prime symbol (e.g., the delay $n_{b1'}$ in FIG. 21).

Temporal patterns of input spike timing (e.g., the example 2004 in FIG. 20) may be decoded with a profile of delays having relative differences corresponding to the time differences between spikes in the temporal pattern. Specifically, there may be at least one delay $n_{Ai}$, given a timing resolution of $\Delta t$, for afferent A arriving at time $t_A$ relative to a time reference $t_{ref}$, i.e., $$\Delta t = \frac{t_{ref} - t_A}{\Delta t}. \quad (1)$$

It should be noted that the reference time may refer to a reference afferent (e.g., the afferent a) or an absolute time reference or a relative time reference other than afferents (e.g., oscillation), and the timing $t_A$ may be coincidingly relative or absolute.

One perspective of this can be that the time delays may effectively translate a delay pattern into a coincidence that is decoded as described above. If a sufficient number of the requisite delays do not exist (the prime indications of delays in FIGS. 20-21 indicating they are different), the delayed spikes may be more distributed in time than aligned (see an example 2202 in FIG. 22). This may either cause the neuron x to not spike (or cause it to spike at a different time, e.g., later). This may be different from if the requisite pattern is not provided as input (see an example 2204 in FIG. 22), where a similar result may occur (non-firing) but because the neuron may not be configured to recognize that pattern.

Figure 22:
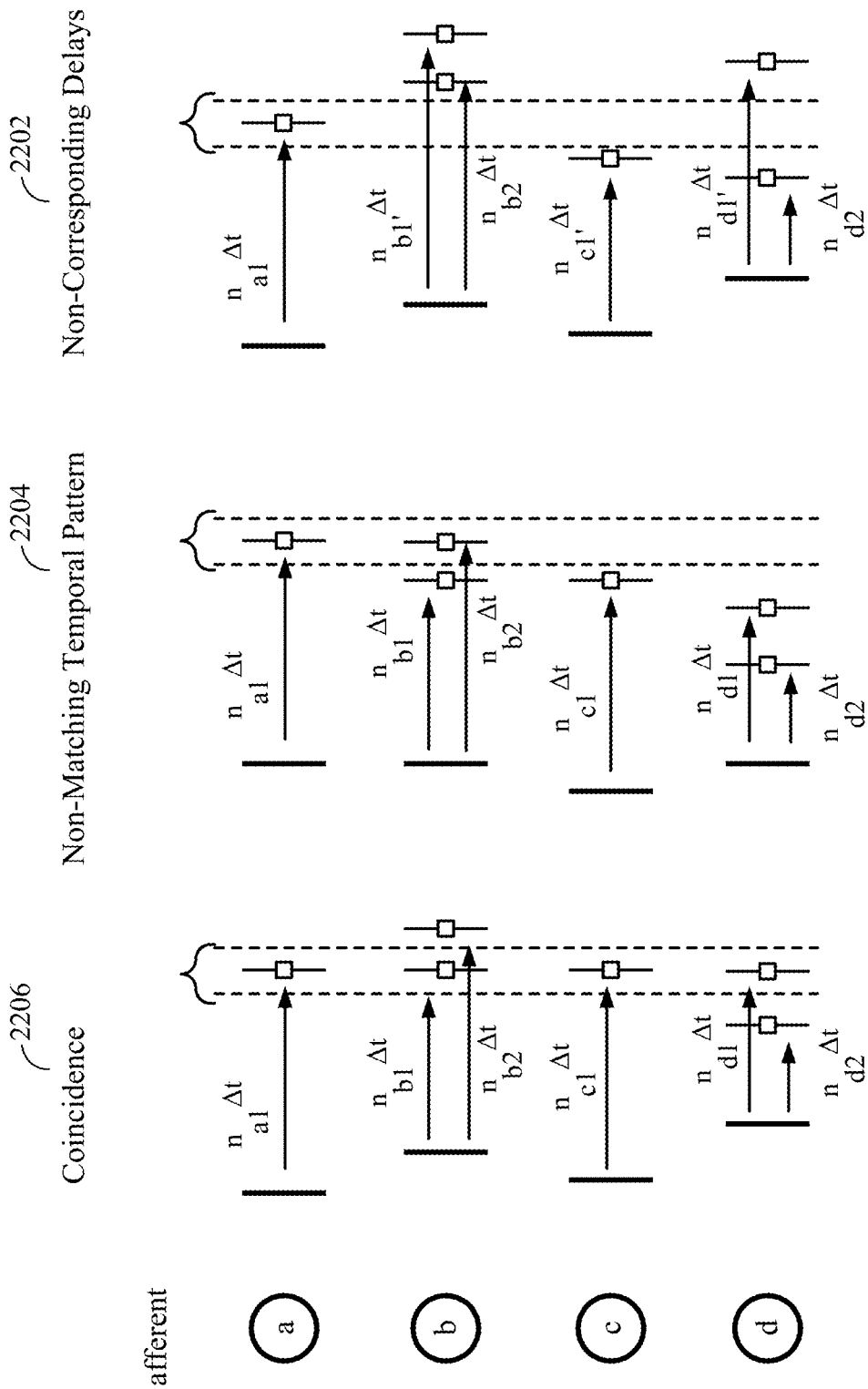
FIG. 22 illustrates an example of temporal pattern decoding with dependency on relative delays in accordance with certain aspects of the present disclosure.

It can be again noticed that it may not be required that all such delays correspond to the temporal pattern, e.g., as with the delay $n_{b2}$ in the example 2004 in FIG. 20 or in an example 2206 in FIG. 22. In fact, a neuron may have considerably more non-corresponding delays to inputs than corresponding delays and still be capable of distinguishing a desired temporal pattern among a very large number of possible inputs. If there are M afferents, resolvable time resolution may be $\Delta t$, and the delay range may be between $\Delta t$ and T, then the number of possible input temporal patterns with one spike per afferent may be:

$$C_1 = \left(\frac{T}{\Delta t}\right)^M. \quad (2)$$

The number of possible input temporal patterns with any number of spikes per afferent may be:

$$C = \left(2^{\frac{T}{\Delta t}}\right)^M. \quad (3)$$

Figure 23:
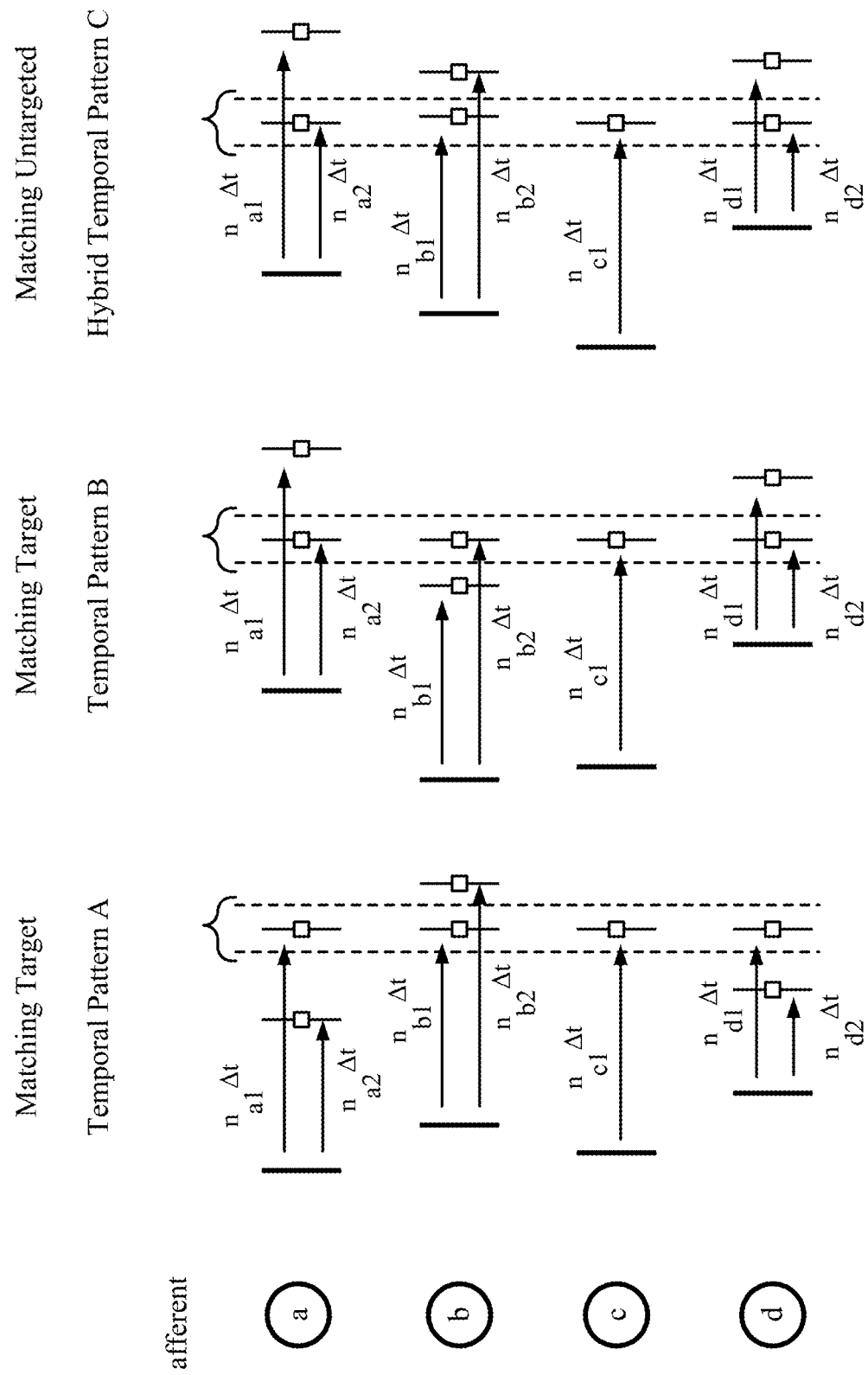
FIG. 23 illustrates an example of logical OR temporal pattern matching in accordance with certain aspects of the present disclosure.

Clearly, the number of possible patterns may grow very large even for relatively small number of afferents and delay range. Thus, if a single neuron has delays corresponding to, for example, two temporal patterns, the probability of recognizing a third undesired pattern may be vanishingly small (i.e., $1/(C_1-2)$), and may be associated with a temporal pattern which is a hybrid of the target delay patterns. In other words, a logical OR operation may be implemented on input patterns with high efficiency, as illustrated in FIG. 23 (pattern C may be a hybrid of patterns A and B). If necessary, such untargeted patterns may be rejected by architectures with inhibition or by separate neurons to distinguish the patterns, or the delays may be grouped in a "dendritic branch" such that the delays corresponding to particular patterns may be summed super-linearly within the branch but not across branches. Another way to accomplish this can be to apply a firing threshold per dendritic branch of neuron x. It should be also noted that there might be no need to double the number of connections to match two different patterns since at least one delay may be reused (see, for example, the delay $n_{c1}$ in FIG. 23).

It can be further noticed that although patterns A and B are illustrated as being temporal patterns in FIG. 23, there is no reason one or both could not be partially or entirely a coincidence pattern (with equal delays). In other words, a single neuron may be configured to recognize a mix of temporal patterns and coincidences.

It is further proposed in the present disclosure that firing (spike) rates of inputs (the example 2002 in FIG. 20) may also be decoded with such a method if two or more delays are provided per input (afferent), where the delays may correspond to the inter-spike interval of the afferent (the inverse of the targeted input firing rate $f_A$ for afferent A), i.e.:

$$f_A = \frac{1}{(n_{Aj} - n_{Ai})\Delta t}. \quad (4)$$

Figure 24:
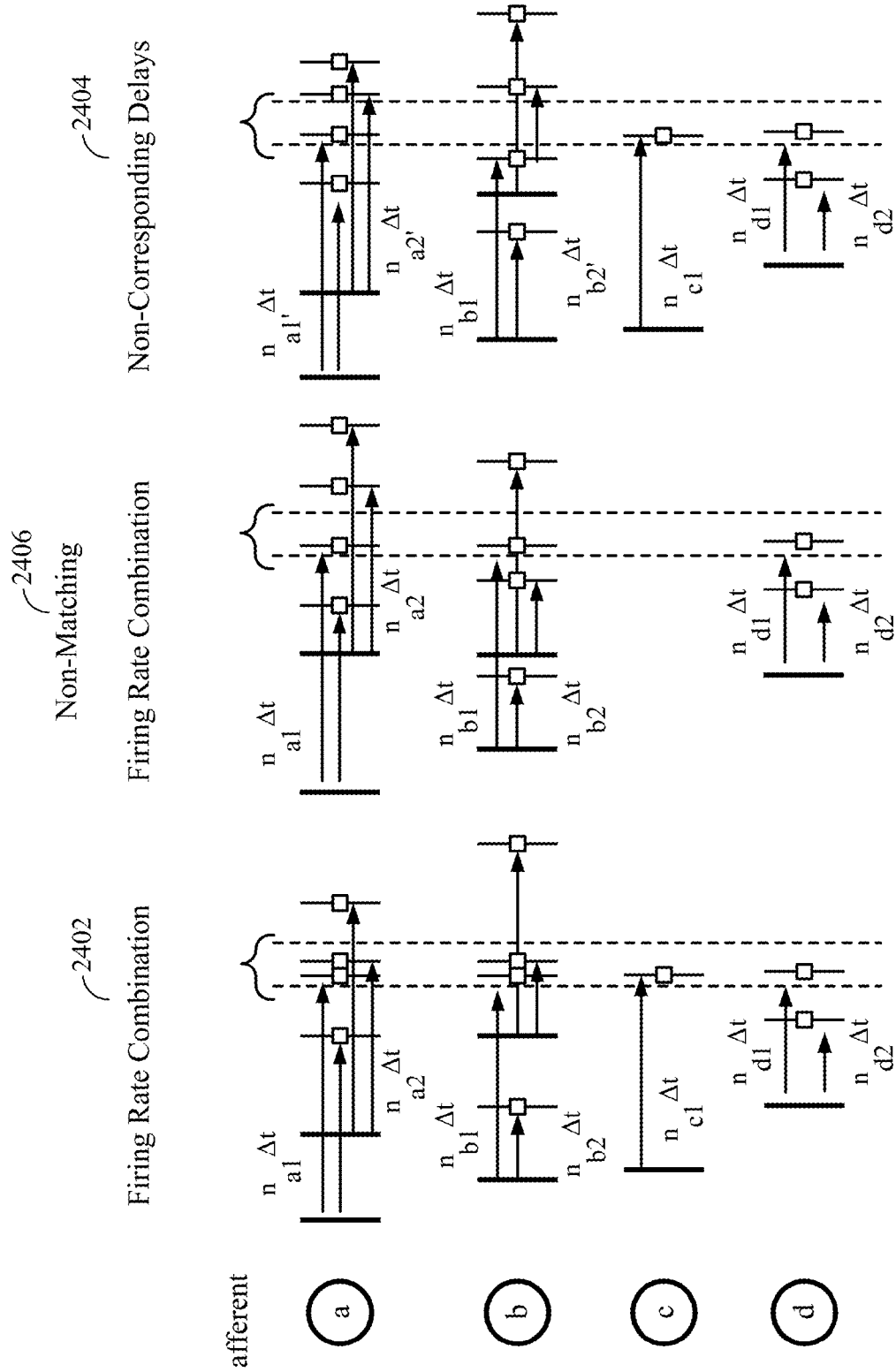
FIG. 24 illustrates an example of firing rate decoding with dependency on relative delays in accordance with certain aspects of the present disclosure.

Since the spikes of a single input may be realigned into the integration window, the neuron x may decode firing rate, firing when the combination (integration) of coinciding delayed inputs exceeds a threshold. Similar to coincidence and temporal pattern matching, as illustrated in FIG. 24, it may not be necessary that all delays correspond to each other (e.g., the delay $n_{d2}$ in an example 2402 in FIG. 24 and in the example 2006 in FIG. 20). Furthermore, it may be expected that delays that bring spikes from one input into alignment may also produce superfluous auxiliary delayed spikes that may not align (e.g., the delay $n_{a1}$ applied to the second input spike from afferent a in FIG. 24), but these may be subthreshold and thus may not disrupt pattern matching performance.

Furthermore, delays corresponding to a different rate than submitted to the neuron may not result in firing given a distinguishing threshold (i.e., compare submitting the same pattern in the examples 2402, 2404 in FIG. 24 with different delays; and compare submitting a different pattern in an example 2406 to the same delay configuration). For example, in FIG. 24, a threshold may be configured at 6 so that firing of neuron x may occur when the firing rate combinations shown in the example 2402 (target firing rate combination) occurs and not others.

Figure 25:
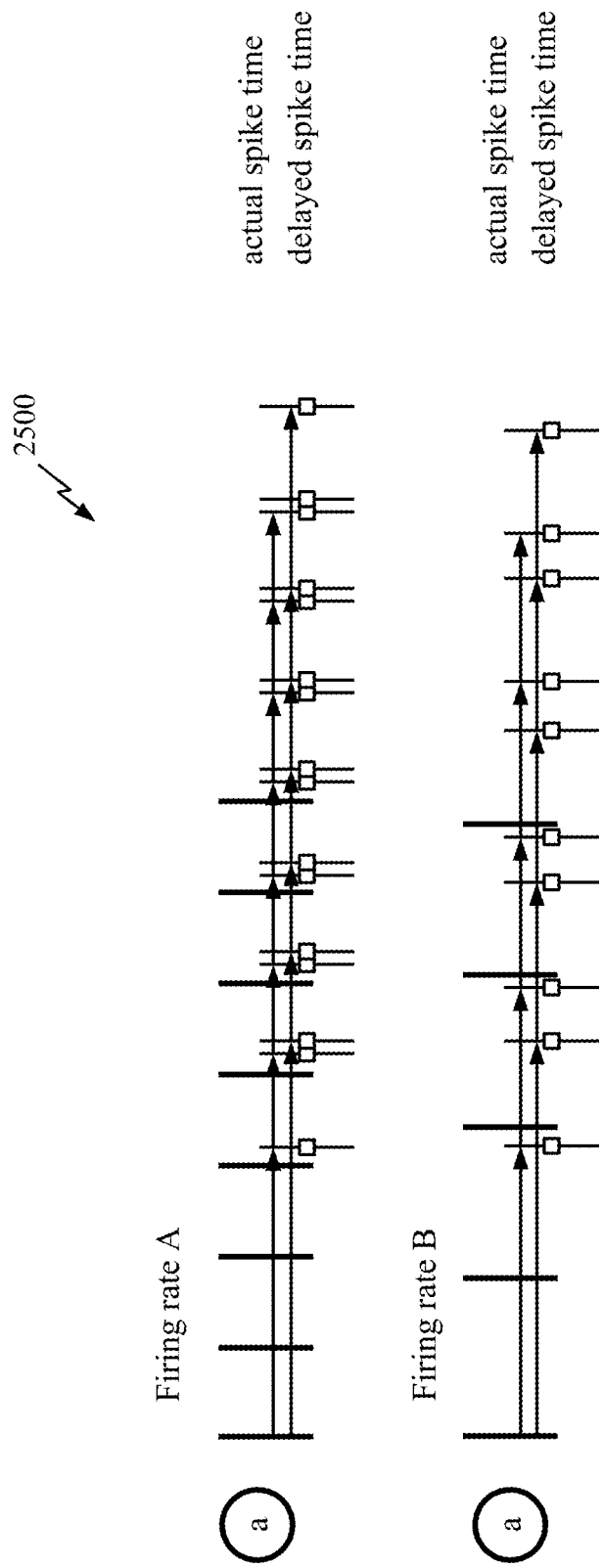
FIG. 25 illustrates an example of firing rate decoding wherein a firing rate is a target rate to decode in accordance with certain aspects of the present disclosure.

FIG. 25 illustrates an example 2500 where two different firing rates may be submitted for an afferent a to a neuron x configured with the same delay pair for the afferent a. The delay pair may be configured for a target rate A, i.e., to cause images of original spikes to coincide closely.

Figure 26:
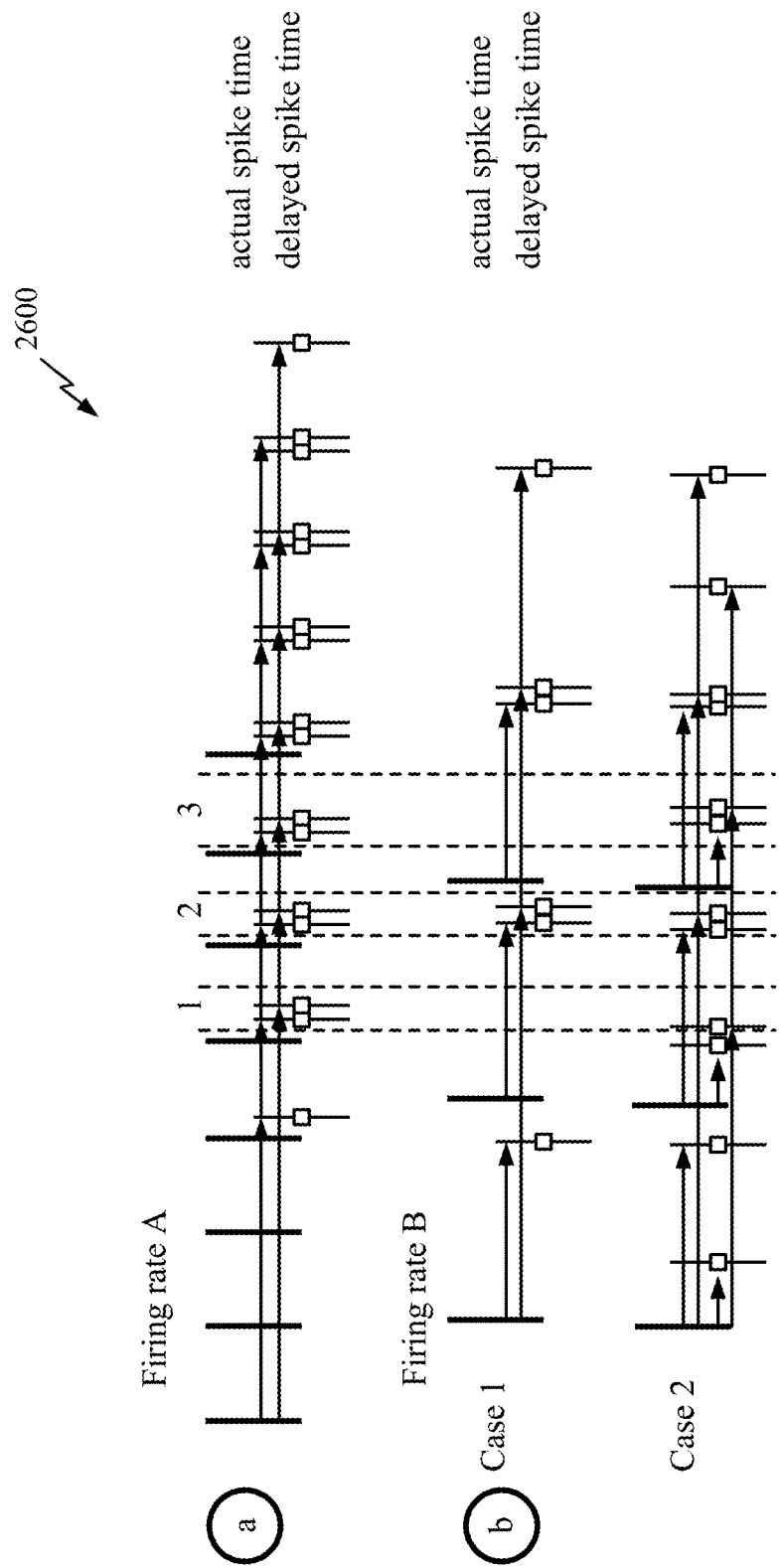
FIG. 26 illustrates an example of firing rate decoding with converting rate to coincidence in accordance with certain aspects of the present disclosure.

FIG. 26 illustrates an example 2600 on how two delays per afferent (in this case for the afferents a and b) may be used to align images of the original spike. By setting a threshold of the neuron x to a level corresponding to a number of coinciding images (e.g., two in FIG. 26), the firing rate of a single afferent may be matched. However, when trying to match a combination of rates (one rate from A and one rate from B), if only a pair of delays is used per afferent, depending on the alignment of the afferent firing rate sequences, it may take some time before the images (delays spikes) from both afferents may align within an integration window (compare images for the afferent a with case 1 images for the afferent b).

However, the expected delay may be reduced by adding more delays (for example, in case 2 of the afferent b, there are three delays and it is more likely that the images of afferents a and b fall within the window). It might be considered configuring a neuron x with more than two delay taps per afferent in order to match not merely a pair of input spikes occurring at the target input firing rate but rather a sequence of spikes at the target input firing rate (for example, for robustness). However, it should be noted that aliasing may occur if more than a pair of delays per afferent are used and they are configured for consecutive spikes, unless the threshold is set high enough to match only a full sequence. Thus, it may be desired to configure the delays (if there are more than two) in a sparse time arrangement. For example, to match a rate of 1, it might be proposed at delays of 0 and 1. If a longer time window is desired, delays may be added for the same afferent at 3, 4 units of delay resolution. However, if the threshold is increased to require four input units, then the time may be delayed to match (which is at least the maximum delay).

Another way to perform this can be to have separate neurons decode the firing rate for each afferent. In an aspect, neurons x, y, z, and w may decode the target firing rates for afferents a, b, c, and d, respectively. Then, another neuron configured with a slow time constant may be used to match the coincidence of all four, in order to recognize the target firing rate combination. However, this may be also accomplished with one neuron that decodes each firing rate on separate dendritic branches configured with different delays in order to match different firing rates. Yet another way to achieve firing rate recognition may be with recursion. However, this may require that the output is rate coded (spike counting) rather than generic.

Figure 27:
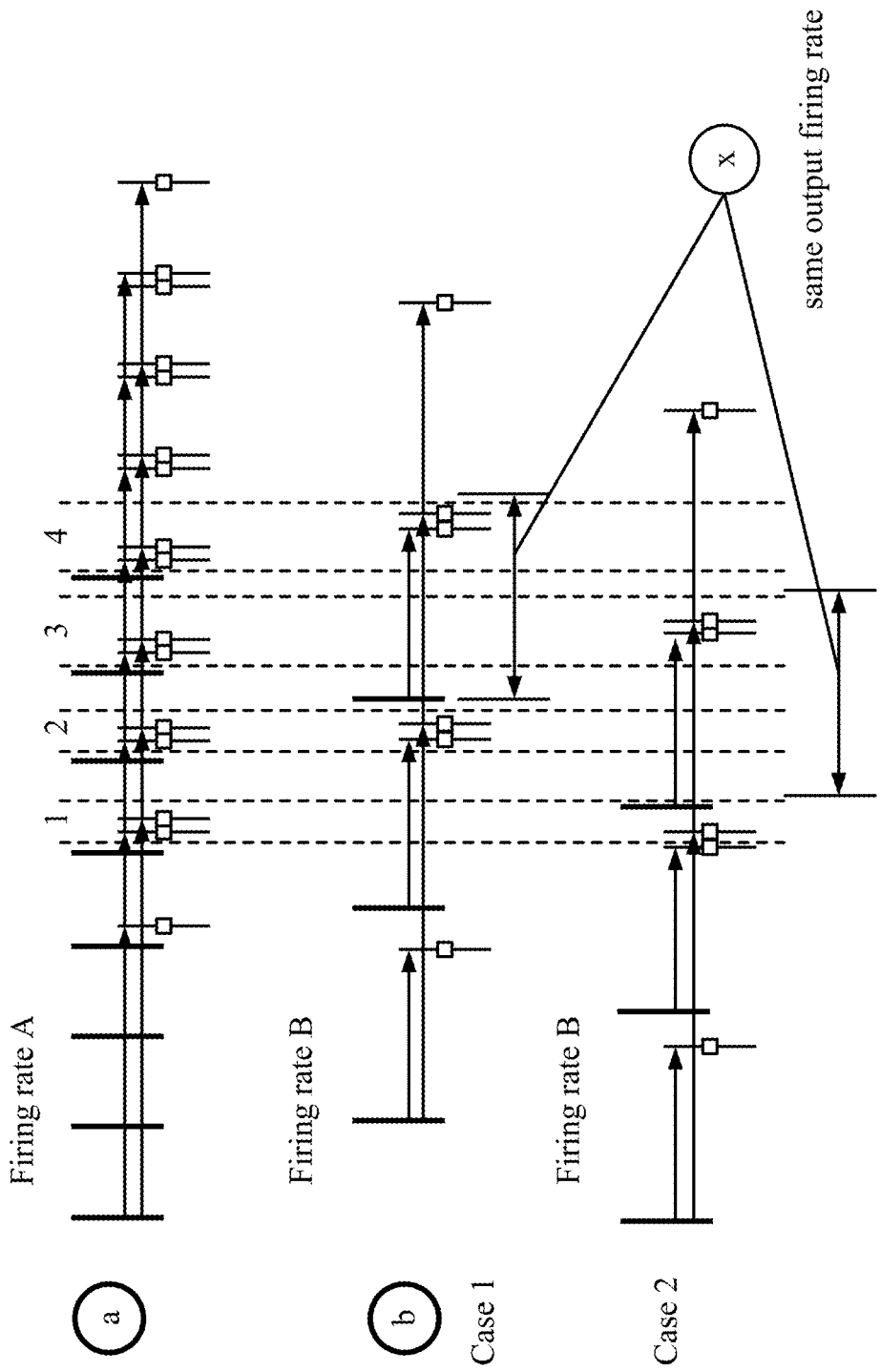
FIG. 27 illustrates an example of firing rate decoding with invariance of output firing rate in accordance with certain aspects of the present disclosure.

Nevertheless, it is proposed that neither of these techniques may be required when the input firing rates are within a reasonable range of one another because encoding information in the form of firing rate is inherently slower (given the same number of afferents) as temporal pattern coding. Thus, decoding firing rates may not need necessarily to be fast. However, a potentially interesting insight from this can be observed: the firing rate of afferent x may merely be a function of the periodicities of afferents (and not their relative offsets), whereas the delay for afferent x to start firing may be a function of their offsets. In other words, in decoding an afferent firing rate combination, a neuron x may fire at a rate that is constant regardless of the offsets of the individual afferent firing rates, as illustrated in FIG. 27. This may hold for two afferents and may hold probabilistically for many afferents. However, the firing rate may change if there are more than two afferents depending on the probability of overlap of images. Moreover, it may be possible that learning can be applied in a manner that results in the same firing rate regardless of the firing rate combination offsets because multiple delay pairs can be used, and a neuron's time window of integration can be modified.

In the above three coding cases (coincidence, temporal, firing rate/rate combination), it can be noted that not all delays need to align target input timing. Therefore, a single neuron may be configured to decode (recognize) multiple difference coincidences, multiple different temporal patterns, or multiple firing rates or rate combinations. Moreover, a single neuron may be configured to decode a mixture of coincidence patterns, temporal patterns, and firing rates or rate combinations. The above methods may be generalized, and the architectural or dendritic branch methods may be applied to these combinations to reduce the possibility of a match of a hybrid or untargeted pattern.

Universal Learning—One Method for all Codes: Coincidence, Temporal and Firing Rate Combinations A neuron's configuration may be plastic, so the weight(s) (and/or delays and/or number of connections/synapses) associated with connections to a particular input may be learned. Typically, Hebbian learning or spike-timing-dependent plasticity (STDP) can be used in unsupervised learning to learn the proximate causality relationship between input and output. Such methods may be applied to temporal pattern learning and, it is shown in the present disclosure how two or more delays per afferent may be used to match firing rates, that such learning may be applied to universally learn coincidences, temporal patterns and/or firing rates or rate combinations input to a particular neuron. A key element to this is that learning may be applied to connections based on timing of aligned (image) spikes and not the original spike timing.

As alluded to above, the quality of neuron decoding of an input coincidence, temporal pattern or firing rate may depend on the neuron's integration window. This window may be essentially the instantaneous time constant of the neuron (e.g., the soma membrane). Thus, temporal and rate fidelities may depend on this. However, the time constant may change dynamically, and this may be important for learning and operating in different regions of the coding spectrum (rate, temporal or coincidence).

Figure 28:
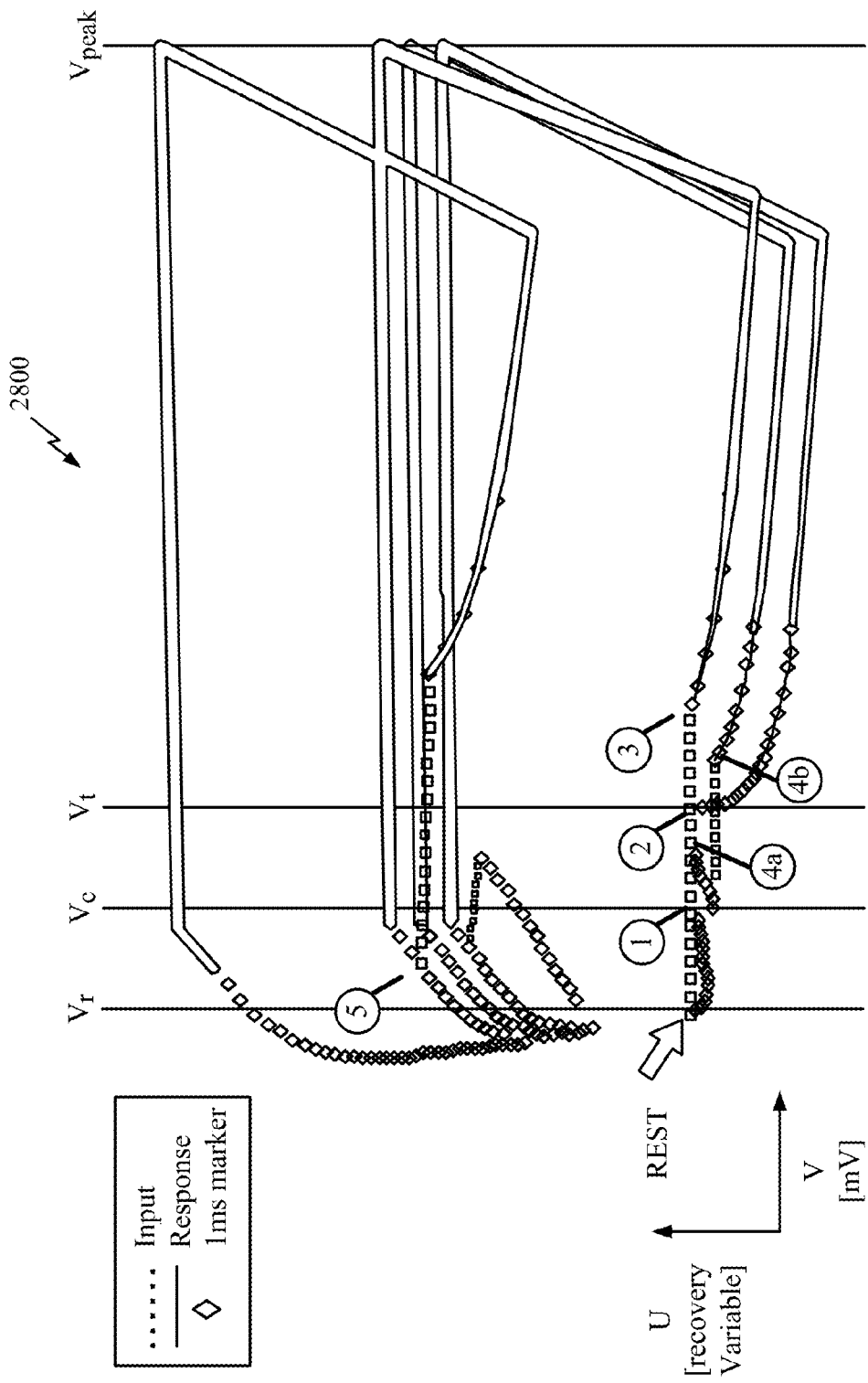
FIG. 28 illustrates an example of temporal phase portrait of simple spiking model exposed to different input timing in accordance with certain aspects of the present disclosure.

FIG. 28 illustrates an example 2800 of a temporal phase portrait that marks the path of a modeled neuron's voltage and recovery variables as it receives different input and spikes (or does not spike). Any point of the path may be associated with a certain delay since the first input (e.g., the delay may be between 0 ms and 50 ms). The simple spiking model proposed by Izhikevich can be used, configured with neocortical pyramidal cell parameters. The following cases are illustrated where the time refers to the time of arrival at the soma (after any delays applied per connection or afferent): input of 10 synapses at 0 ms, input of 20 synapses at 0 ms, input of 30 synapses at 0 ms, inputs of 15 synapses at 0 ms and 15 synapses more at 10 ms, and input of 30 synapses at 35 ms (after 3 above).

Numbered pins in the diagram 2800 correspond to the point immediately after the input is applied. Inputs may correspond to a depolarization step (e.g., from REST) to the pin. If the input depolarization is sub-threshold ($v_t$), then the voltage may decay back toward rest. If the input depolarization is above a threshold, then the depolarization may destabilize and grow to $v_{peak}$, and a spike may occur. After the spike, the voltage may recover to the recovery point, but the recovery of the neuron may take some additional time (recovery of u back to REST).

Three temporal fidelity aspects can be pointed. First, the time to recover from sub-threshold input depolarization may vary depending on the input (compare 1 versus 4a in FIG. 28). Second, the time to fire may vary depending on the input timing, balance (between input components) and total amount (compare 2 vs 3 vs 4b in FIG. 28). Third, the time to fire may vary depending on the activity level (prior firing) (compare 3 versus 5 in FIG. 28).

Figure 29:
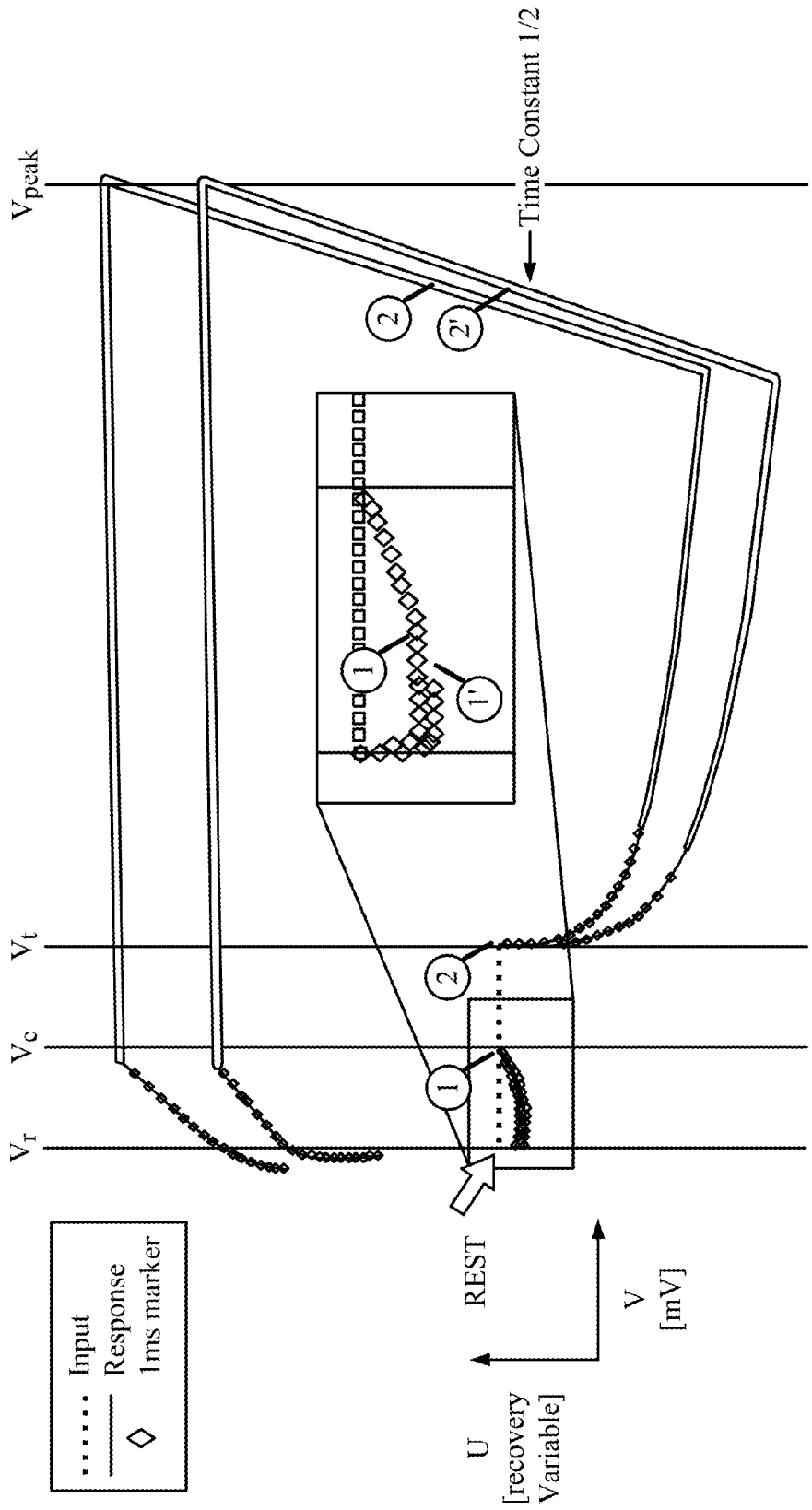
FIG. 29 illustrates an example of temporal phase portrait of simple spiking model exposed to different nominal time constant in accordance with certain aspects of the present disclosure.

Thus, a neuron which is very active may be operating with a lower time constant and thus higher temporal (and thus rate) fidelity. If it is considered that operating in a firing rate coding manner as operating in relatively high activity levels (as opposed to occasional timed spikes), then a neuron may adapt to a high firing rate by adjusting its fidelity to be appropriately more precise. This may be a key aspect for coding and learning because the time constant can be effectively modified. For comparison (see graphs in FIG. 29), the nominal time constant of the model may be changed by ½ (i.e., twice as fast) to show that a similar effect may be achieved as providing more input or operating at a higher activity level.

According to certain aspects of the present disclosure, homeostasis or neuronal regulation and lateral inhibition may be a key element in learning to regulate the firing activity of a neuron and thus learning. While operating in a different part of the coding spectrum (firing rate versus temporal pattern, for example), a neuron's activity level may differ. Thus, it may not be proposed targeting a specific firing rate but rather allowing for a range of firing rates. It is proposed in the present disclosure to boost firing rates over a long term if they fall below a lower bound and dampen firing rates over a long term if they fall above an upper bound. Allowing such a range may be a key element to general coding. It may be desired that a neuron can learn either coincidences, temporal patterns, or firing rates or rate combinations depending on what it is exposed to. Thus, it can be recommended allowing a neuron to have a range of firing rates rather than targeting a specific long-term output rate.

A biologically consistent spike timing dependent plasticity can be defined as follows. If the input spike sequence of an afferent connection i to a neuron j is given by $x_{i,j}(t)$ (subsequent to application of delay to the original afferent signal) and the output of neuron j is given by $y_j(t)$, and both are binary sequences, sensitivity to learning on firing of j may be defined by:

$$s_{i,j}^{LTP}(t+1) = \max(x_{i,j}(t), \alpha_{LTP} s_{i,j}^{LTP}(t)), \quad (5)$$

and sensitivity to learning on input by:

$$s_{i,j}^{LTD}(t+1) = \min(-y_j(t), \alpha_{LTD} s_{i,j}^{LTD}(t)), \quad (6)$$

where LTP refers to Long-Term Potentiation, LTD refers to Long-Term Depression, and $\alpha_{LTP}$, $\alpha_{LTD}$ are corresponding IIR (Infinite Impulse Response) filter coefficients.

Figure 30:
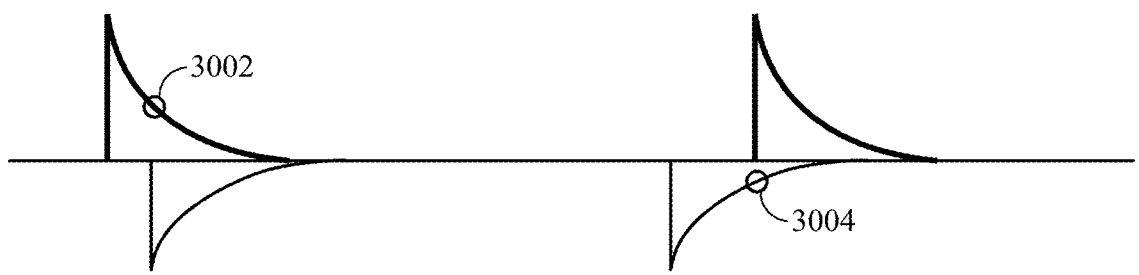
FIG. 30 illustrates an example STDP implementation in accordance with certain aspects of the present disclosure.

In the absence of further input, the filters may thus decay according to those coefficients. Weight for synapse (connection) i may be adjusted upon firing by the amount $s_{i,j}^{LTP}$ (a dot 3002 in FIG. 30), whereas weight for synapse (connection) i may be adjusted by the amount $s_{i,j}^{LTD}$ when the input is received at the soma after the delay (a dot 3004 in FIG. 30).

It is proposed in the present disclosure that while a detailed spiking model for neuron may not be required, adapting the integration time window (time constant) of the neuron for decoding and learning may be a key aspect in combination with two or more time delays per afferent such that generalized decoding and learning is possible. According to certain aspects of the present disclosure, the aforementioned learning rules may be applied in a general manner to learn input patterns whether they are coincidences, temporal patterns, or firing rates or combinations thereof. Furthermore, the learning rules may need to be applied based on the delayed timing. Otherwise, firing rates and temporal pattern matching may be compromised.

To learn a pattern, a neuron may need to be associated with a set of delays that correspond to the coincidence, temporal pattern or firing rate. Yet, in general, the characteristics of these delays and connections may vary depending on the coding scheme: coincidence may require equal delays across different inputs, temporal pattern may require different delays across different inputs, firing rate combinations may require multiple different-delay connections per input. But, for efficiency, it may be desired to minimize the number of connections. Thus, the structural plasticity is also proposed in the present disclosure as follows. For generalized learning, a neuron may learn multiple connections to one input or to diverse inputs depending on the coding scheme in use. This may be accomplished by allowing the learning scheme to reduce or increase weights according to the rules above. However, a method of structural plasticity is proposed such that new connections may be made to different inputs with different delays. In the preferred aspect, a connection may be reused that has been depressed by learning to a very low value, and may be reassigned to a random input with a random delay (within the allowed range). It can be recommended to start that new connection with a low weight so that the overall neuron's behavior may not change significantly merely because of the addition of a new (or reused) connection.

Figure 31:
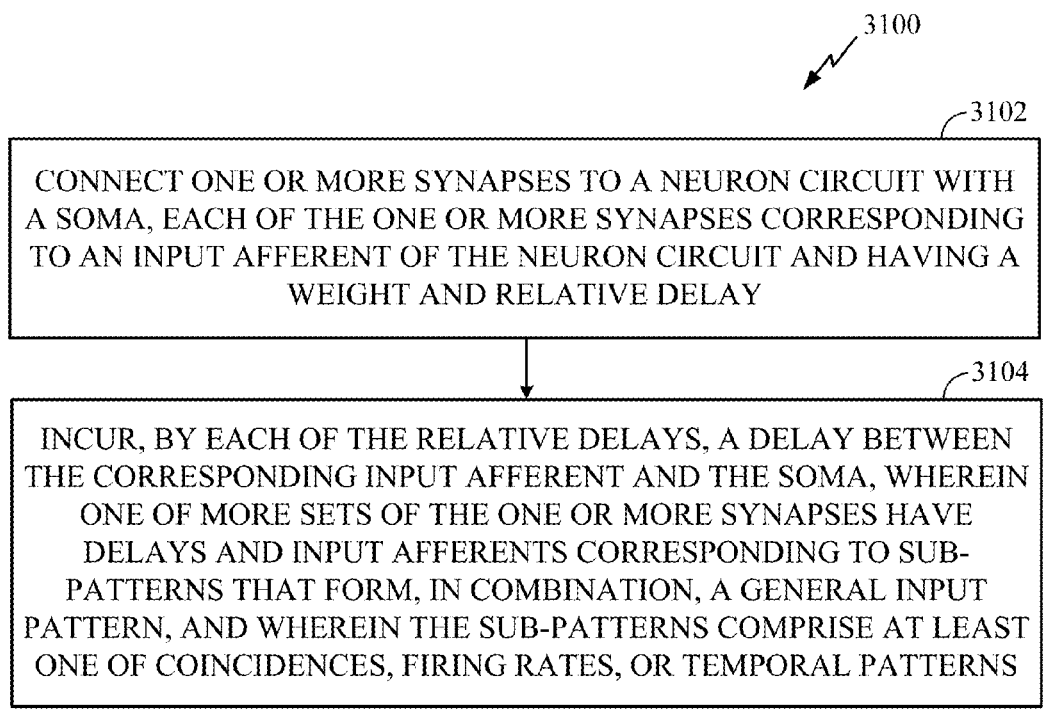
FIG. 31 illustrates example operations of neural coding for general input patterns in accordance with certain aspects of the present disclosure.
Figure 31A:
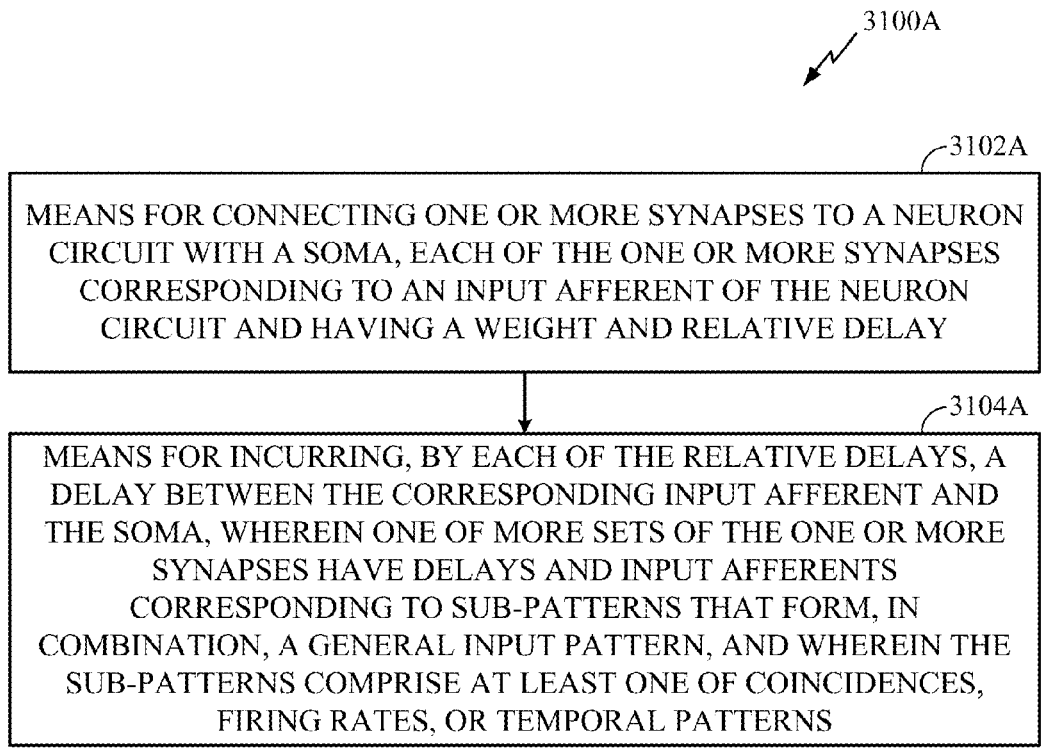
FIG. 31A illustrates example components capable of performing the operations illustrated in FIG. 31.

FIG. 31 illustrates example operations 3100 of neural coding for general input patterns in accordance with certain aspects of the present disclosure. At 3102, one or more synapses may be connected to a neuron circuit with a soma, each of the one or more synapses corresponding to an input afferent of the neuron circuit and having a weight and relative delay. At 3104, it may incur, by each of the relative delays, a delay between the corresponding input afferent and the soma, wherein one or more sets of the one or more synapses may have delays and input afferents corresponding to sub-patterns that form, in combination, one of the general input patterns, and the sub-patterns may comprise at least one of coincidences, firing rates, or temporal patterns.

According to certain aspects of the present disclosure, a set of synapses corresponding to the coincidence sub-pattern may have the same delays for different input afferents, a set of synapses corresponding to the firing pattern sub-pattern may have different delays for same input afferent, and a set of synapses corresponding to the temporal pattern sub-pattern may have different delays for different input afferents.

In an aspect of the present disclosure, a delay may be minimized for the neuron circuit to respond to a learned firing rate by having two or more sets of the synapses corresponding to the firing pattern having delays that are offset from one another. In addition, some of the synapses from the two or more sets may be punctured (removed) to omit time offsets that cause firing of the neuron circuit due to aliases of one or more undesired rates. In an aspect, an integration window of firing of the neuron circuit may vary depending on a degree to which the neuron circuit has multiple delays per connection or delays for different connections that are the same as opposed to single connections input with delays that are unequal to other connections.

In an aspect of the present disclosure, the connections depressed because of learning may be reassigned to the same input with a delay different from any already in use by an already existing connection to that same input. In another aspect, the connections depressed because of learning may be reassigned to a different input.

In an aspect of the present disclosure, a difference in time between delays in a set of delays for one of the input afferents of the neuron circuit may correspond to a multiple of inverse of firing rate associated with that one input afferent. Further, one or more superfluous auxiliary delayed spikes of the input afferent being not aligned may be below one or more thresholds, and the one or more sub-threshold superfluous auxiliary delayed spikes may not disrupt pattern matching performance of the neuron circuit.

Figure 32:
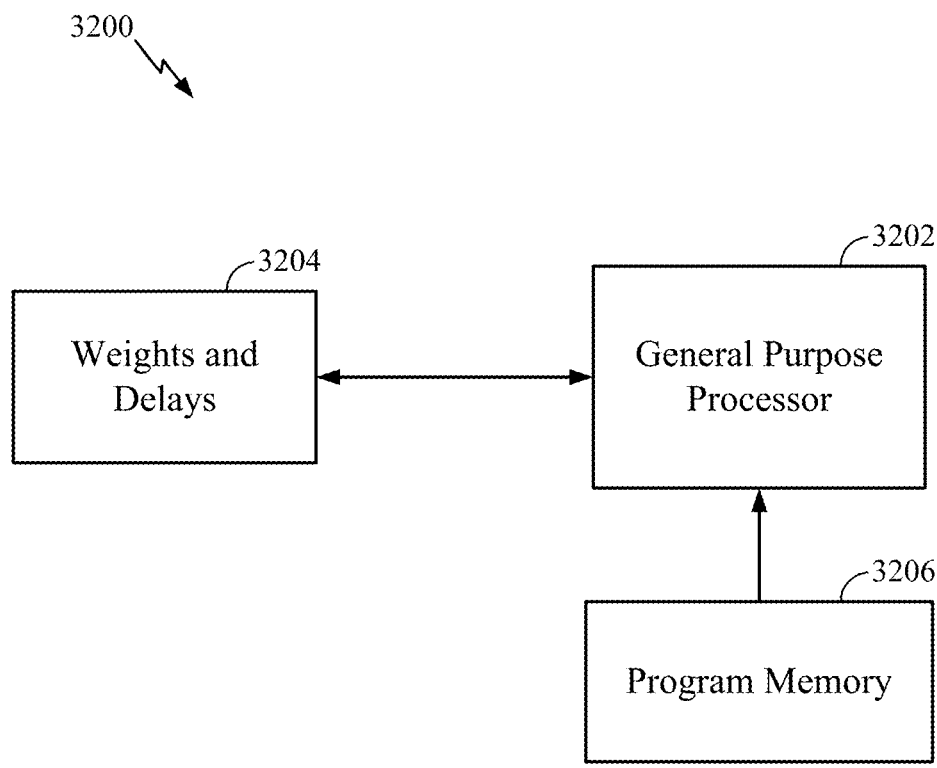
FIG. 32 illustrates an example software implementation of neural coding using a general-purpose processor in accordance with certain aspects of the present disclosure.

FIG. 32 illustrates an example software implementation 3200 of the aforementioned methods for neural temporal coding using a general-purpose processor 3202 in accordance with certain aspects of the present disclosure. Weights and delays associated with each connection (synapse) of a computational network (neural network) may be stored in a memory block 3204, while instructions related to the neural coding being executed at the general-purpose processor 3202 may be loaded from a program memory 3206.

In one aspect of the present disclosure, the instructions loaded into the general-purpose processor 3202 may comprise code for utilizing a relative delay line abstraction which delays one or more synaptic inputs into a neuron circuit of the neural network by time delay, code for applying a dynamic spiking model to determine spiking behavior of the neuron circuit based on weighted and delayed synaptic inputs of the neuron circuit, and code for adjusting, according to an unsupervised learning rule, weights associated with the synaptic inputs depending on timing relation of the neuron circuit spiking and the delayed synaptic inputs. In another aspect, the instructions loaded into the general-purpose processor 3202 may comprise code for connecting each layer of neuron circuits in the hierarchical multi-layer neural network to an input and to another layer of neuron circuits in the multi-layer neural network, and code for matching a first layer of neuron circuits in the multi-layer neural network with a first subsection of an input pattern, wherein that connected layer may match combination of firing of neuron circuits of the other layer as a result of matching a subsection of the input pattern and another subsection of the input pattern. In yet another aspect, the instructions loaded into the general-purpose processor 3202 may comprise code for providing, via synapses with associated delays, synaptic inputs into a neuron circuit of the neural network, wherein at least one of the synaptic inputs may be associated with at least one of the synapses being self-connected, the synapses may belong to a plurality of sets, and at least one of the sets may comprise a delay combination to match a first part of a pattern of the synaptic inputs not comprising a recursive self-connection. In yet another aspect, the instructions loaded into the general-purpose processor 3202 may comprise code for connecting one or more synapses to a neuron circuit with a soma of the neural network, each of the one or more synapses may correspond to an input afferent of the neuron circuit and have a weight and relative delay, and code for incurring, by each of the relative delays, a delay between the corresponding input afferent and the soma, wherein one or more sets of the one or more synapses may have delays and input afferents corresponding to sub-patterns that form, in combination, a general input pattern, and the sub-patterns may comprise at least one of coincidences, firing rates, or temporal patterns.

Figure 33:
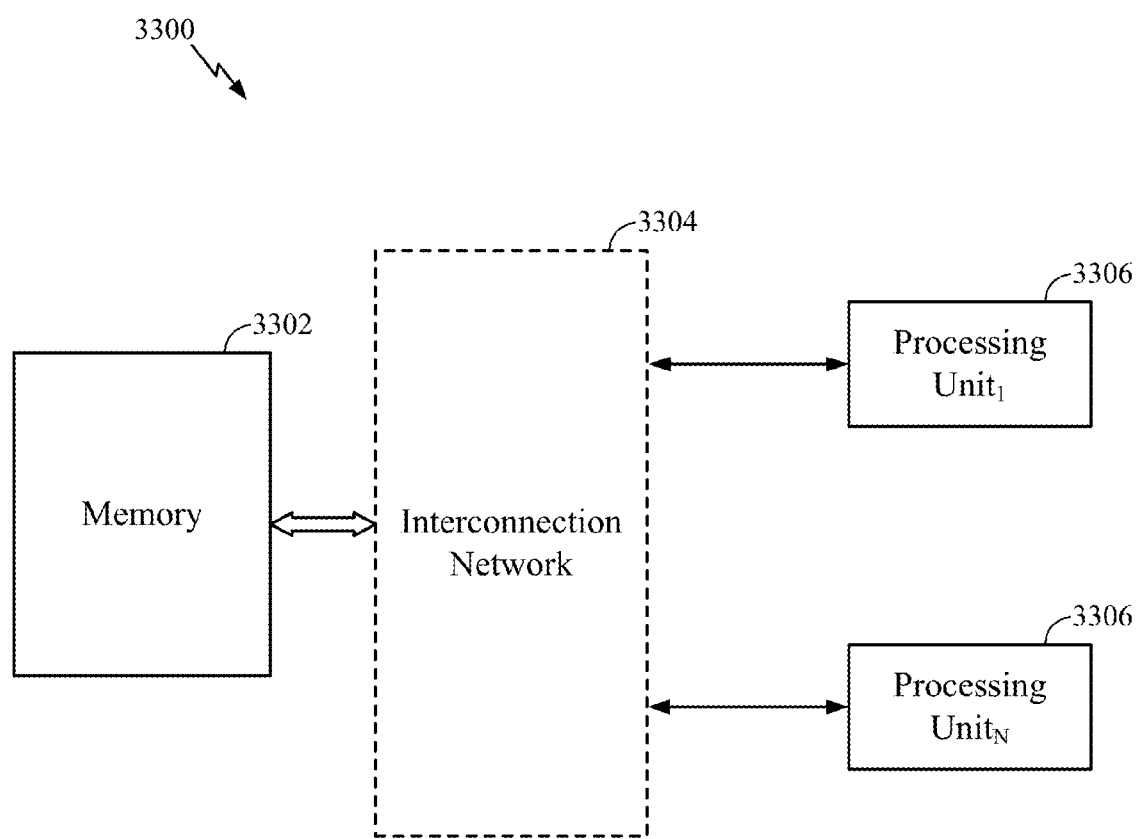
FIG. 33 illustrates an example implementation of neural coding where a memory may be interfaced with individual distributed processing units in accordance with certain aspects of the present disclosure.

FIG. 33 illustrates an example implementation 3300 of the aforementioned methods for neural temporal coding where a memory 3302 can be interfaced via an interconnection network 3304 with individual (distributed) processing units (neural processors) 3306 of a computational network (neural network) in accordance with certain aspects of the present disclosure. One or more weights and delays associated with one or more connections (synapses) of the computational network (neural network) may be loaded from the memory 3302 via connection(s) of the interconnection network 3304 into each processing unit (neural processor) 3306.

In one aspect of the present disclosure, the processing unit 3306 may be configured to utilize a relative delay line abstraction which delays one or more synaptic inputs into a neuron of the neural network by time delays, apply a dynamic spiking model to determine spiking behavior of the neuron based on weighted and delayed synaptic inputs of the neuron, and adjust, according to an unsupervised learning rule, weights associated with the synaptic inputs depending on timing relation of the neuron spiking and the delayed synaptic inputs. In another aspect, the processing unit 3306 may be configured to connect each layer of neurons in the hierarchical multi-layer neural network to an input and to another layer of neurons in the multi-layer neural network, and match a first layer of neurons in the multi-layer neural network with a first subsection of an input pattern, wherein that connected layer may match combination of firing of neurons of the other layer as a result of matching a subsection of the input pattern and another subsection of the input pattern. In yet another aspect, the processing unit 3306 may be configured to provide, via synapses with associated delays, synaptic inputs into a neuron of the neural network, wherein at least one of the synaptic inputs may be associated with at least one of the synapses being self-connected, the synapses may belong to a plurality of sets, and at least one of the sets may comprise a delay combination to match a first part of a pattern of the synaptic inputs not comprising a recursive self-connection. In yet another aspect, the processing unit 3306 may be configured to connect one or more synapses to a neuron with a soma of the neural network, each of the one or more synapses may correspond to an input afferent of the neuron and have a weight and relative delay, and incur, by each of the relative delays, a delay between the corresponding input afferent and the soma, wherein one or more sets of the one or more synapses may have delays and input afferents corresponding to sub-patterns that form, in combination, one of the general input patterns, and the sub-patterns may comprise at least one of coincidences, firing rates, or temporal patterns.

Figure 34:
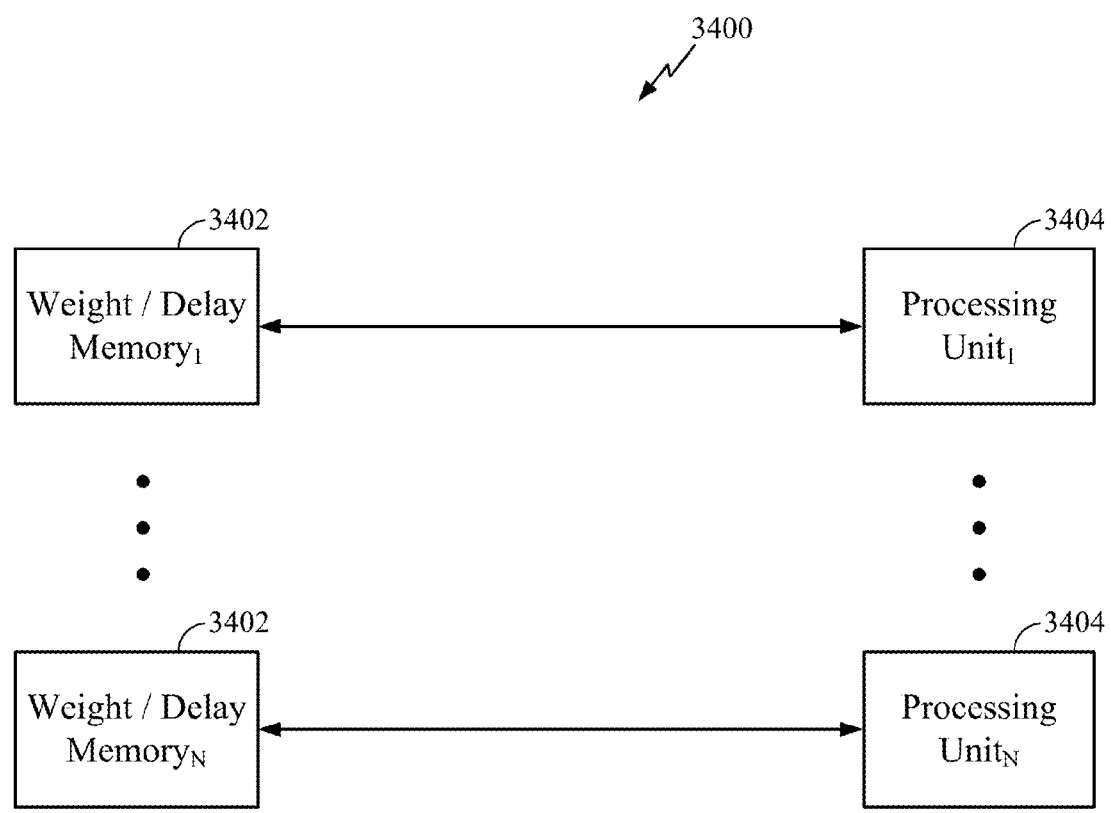
FIG. 34 illustrates an example implementation of neural coding based on distributed memories and distributed processing units in accordance with certain aspects of the present disclosure.

FIG. 34 illustrates an example implementation 3400 of the aforementioned methods for neural temporal coding based on distributed weight/delay memories 3402 and distributed processing units (neural processors) 3404 in accordance with certain aspects of the present disclosure. As illustrated in FIG. 34, one memory bank 3402 may be directly interfaced with one processing unit 3404 of a computational network (neural network), wherein that memory bank 3402 may store one or more weights and delays of one or more connections (synapses) associated with that processing unit (neural processor) 3404.

In one aspect of the present disclosure, the processing unit 3404 may be configured to utilize a relative delay line abstraction which delays one or more synaptic inputs into a neuron of the neural network by time delays, apply a dynamic spiking model to determine spiking behavior of the neuron based on weighted and delayed synaptic inputs of the neuron, and adjust, according to an unsupervised learning rule, weights associated with the synaptic inputs depending on timing relation of the neuron spiking and the delayed synaptic inputs. In another aspect, the processing unit 3404 may be configured to connect each layer of neurons in the hierarchical multi-layer neural network to an input and to another layer of neurons in the multi-layer neural network, and match a first layer of neurons in the multi-layer neural network with a first subsection of an input pattern, wherein that connected layer may match combination of firing of neurons of the other layer as a result of matching a subsection of the input pattern and another subsection of the input pattern. In yet another aspect, the processing unit 3404 may be configured to provide, via synapses with associated delays, synaptic inputs into a neuron of the neural network, wherein at least one of the synaptic inputs may be associated with at least one of the synapses being self-connected, the synapses may belong to a plurality of sets, and at least one of the sets may comprise a delay combination to match a first part of a pattern of the synaptic inputs not comprising a recursive self-connection. In yet another aspect, the processing unit 3404 may be configured to connect one or more synapses to a neuron with a soma of the neural network, each of the one or more synapses may correspond to an input afferent of the neuron and have a weight and relative delay, and incur, by each of the relative delays, a delay between the corresponding input afferent and the soma, wherein one or more sets of the one or more synapses may have delays and input afferents corresponding to sub-patterns that form, in combination, one of the general input patterns, and the sub-patterns may comprise at least one of coincidences, firing rates, or temporal patterns.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 1100, 1800, 1900 and 3100 illustrated in FIG. 11, FIG. 18, FIG. 19 and FIG. 31 correspond to components 1100A, 1800A, 1900A and 3100A illustrated in FIG. 11A, 18A, FIG. 19A and FIG. 31A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method of neural temporal coding, comprising:
utilizing a relative delay line abstraction which delays one or more synaptic inputs into a neuron circuit by time delays, wherein each synaptic input of the neuron circuit has a time delay measured relative to other time delays of other synaptic inputs of the neuron circuit;
applying a dynamic spiking model to determine spiking behavior of the neuron circuit based on weighted and delayed synaptic inputs of the neuron circuit;
adjusting, according to an unsupervised learning rule, weights associated with the synaptic inputs depending on timing relation of the neuron circuit spiking and the delayed synaptic inputs;
selecting a reusable synapse associated with the neuron circuit based on a weight of the reusable synapse being reduced by the unsupervised learning rule to a value below a threshold; and
modifying at least one of a weight, a delay, or an afferent of the reusable synapse.

2. The method of claim 1, further comprising:
controlling at least one of the weights, a number of synapses associated with the neuron circuit, time constants of the synapses, a firing threshold of the neuron circuit, a degree of inhibition of the neuron circuit, or a noise associated with the neuron circuit to induce initial firing rates of the neuron circuit.

3. The method of claim 1, further comprising:
applying, by the unsupervised learning rule, simulated annealing for the adjustment of weights.

4. A method of neural temporal coding, comprising:
utilizing a relative delay line abstraction which delays one or more synaptic inputs into a neuron circuit by time delays, wherein each synaptic input of the neuron circuit has a time delay measured relative to other time delays of other synaptic inputs of the neuron circuit;
applying a dynamic spiking model to determine spiking behavior of the neuron circuit based on weighted and delayed synaptic inputs of the neuron circuit;
adjusting, according to an unsupervised learning rule, weights associated with the synaptic inputs depending on timing relation of the neuron circuit spiking and the delayed synaptic inputs;
selecting a reusable synapse associated with the neuron circuit, wherein selecting the reusable synapse is conditioned upon a time having elapsed since the synapse was reused; and
modifying at least one of a weight, a delay, or an afferent of the reusable synapse.

5. An apparatus for neural temporal coding, comprising a processing unit configured to:
utilize a relative delay line abstraction which delays one or more synaptic inputs into a neuron circuit by time delays, wherein each synaptic input of the neuron circuit has a time delay measured relative to other time delays of other synaptic inputs of the neuron circuit;
apply a dynamic spiking model to determine spiking behavior of the neuron circuit based on weighted and delayed synaptic inputs of the neuron circuit;
adjust, according to an unsupervised learning rule, weights associated with the synaptic inputs depending on timing relation of the neuron circuit spiking and the delayed synaptic inputs;
select a reusable synapse associated with the neuron circuit based on a weight of the reusable synapse being reduced by the unsupervised learning rule to a value below a threshold; and
modify at least one of a weight, a delay, or an afferent of the reusable synapse.

6. The apparatus of claim 5, wherein the processing unit is further configured to:
control at least one of the weights, a number of synapses associated with the neuron circuit, time constants of the synapses, a firing threshold of the neuron circuit, a degree of inhibition of the neuron circuit, or a noise associated with the neuron circuit to induce initial firing rates of the neuron circuit.

7. The apparatus of claim 5, wherein the processing system unit is further configured to:
apply, by the unsupervised learning rule, simulated annealing for the adjustment of weights.

8. A apparatus for neural temporal coding, comprising a processing unit configured to:
utilize a relative delay line abstraction which delays one or more synaptic inputs into a neuron circuit by time delays, wherein each synaptic input of the neuron circuit has a time delay measured relative to other time delays of other synaptic inputs of the neuron circuit;
apply a dynamic spiking model to determine spiking behavior of the neuron circuit based on weighted and delayed synaptic inputs of the neuron circuit;
adjust, according to an unsupervised learning rule, weights associated with the synaptic inputs depending on timing relation of the neuron circuit spiking and the delayed synaptic inputs;
select a reusable synapse associated with the neuron circuit, wherein the processing unit is configured to select the reusable synapse conditioned upon a time having elapsed since the synapse was reused; and
modify at least one of a weight, a delay, or an afferent of the reusable synapse.

9. An apparatus for neural temporal coding, comprising:
means for utilizing a relative delay line abstraction which delays one or more synaptic inputs into a neuron circuit by time delays, wherein each synaptic input of the neuron circuit has a time delay measured relative to other time delays of other synaptic inputs of the neuron circuit;

means for applying a dynamic spiking model to determine spiking behavior of the neuron circuit based on weighted and delayed synaptic inputs of the neuron circuit;

means for adjusting, according to an unsupervised learning rule, weights associated with the synaptic inputs depending on timing relation of the neuron circuit spiking and the delayed synaptic inputs;

means for selecting a reusable synapse associated with the neuron circuit based on a weight of the reusable synapse being reduced by the unsupervised learning rule to a value below a threshold; and means for modifying at least one of a weight, a delay, or an afferent of the reusable synapse.

10. The apparatus of claim 9, further comprising:
means for controlling at least one of the weights, a number of synapses associated with the neuron circuit, time constants of the synapses, a firing threshold of the neuron circuit, a degree of inhibition of the neuron circuit, or a noise associated with the neuron circuit to induce initial firing rates of the neuron circuit.

11. The apparatus of claim 9, further comprising:
means for applying, by the unsupervised learning rule, simulated annealing for the adjustment of weights.

12. An apparatus for neural temporal coding, comprising:
means for utilizing a relative delay line abstraction which delays one or more synaptic inputs into a neuron circuit by time delays, wherein each synaptic input of the neuron circuit has a time delay measured relative to other time delays of other synaptic inputs of the neuron circuit;

means for applying a dynamic spiking model to determine spiking behavior of the neuron circuit based on weighted and delayed synaptic inputs of the neuron circuit;

means for adjusting, according to an unsupervised learning rule, weights associated with the synaptic inputs depending on timing relation of the neuron circuit spiking and the delayed synaptic inputs;

means for selecting a reusable synapse associated with the neuron circuit, wherein selecting the reusable synapse is conditioned upon a time having elapsed since the synapse was reused; and means for modifying at least one of a weight, a delay, or an afferent of the reusable synapse.

13. A computer program product for neural temporal coding, comprising a non-transitory computer-readable medium comprising code for:
utilizing a relative delay line abstraction which delays one or more synaptic inputs into a neuron circuit by time delays, wherein each synaptic input of the neuron circuit has a time delay measured relative to other time delays of other synaptic inputs of the neuron circuit;

applying a dynamic spiking model to determine spiking behavior of the neuron circuit based on weighted and delayed synaptic inputs of the neuron circuit;

adjusting, according to an unsupervised learning rule, weights associated with the synaptic inputs depending on timing relation of the neuron circuit spiking and the delayed synaptic inputs;

selecting a reusable synapse associated with the neuron circuit based on a weight of the reusable synapse being reduced by the unsupervised learning rule to a value below a threshold; and modifying at least one of a weight, a delay, or an afferent of the reusable synapse.

14. The computer program product of claim 13, wherein the computer-readable medium further comprises code for:
controlling at least one of the weights, a number of synapses associated with the neuron circuit, time constants of the synapses, a firing threshold of the neuron circuit, a degree of inhibition of the neuron circuit, or a noise associated with the neuron circuit to induce initial firing rates of the neuron circuit.

15. The computer program product of claim 13, wherein the computer-readable medium further comprises code for:
applying, by the unsupervised learning rule, simulated annealing for the adjustment of weights.

16. A computer program product for neural temporal coding, comprising a non-transitory computer-readable medium comprising code for:
utilizing a relative delay line abstraction which delays one or more synaptic inputs into a neuron circuit by time delays, wherein each synaptic input of the neuron circuit has a time delay measured relative to other time delays of other synaptic inputs of the neuron circuit;

applying a dynamic spiking model to determine spiking behavior of the neuron circuit based on weighted and delayed synaptic inputs of the neuron circuit;

adjusting, according to an unsupervised learning rule, weights associated with the synaptic inputs depending on timing relation of the neuron circuit spiking and the delayed synaptic inputs;

selecting a reusable synapse associated with the neuron circuit, wherein selecting the reusable synapse is conditioned upon a time having elapsed since the synapse was reused; and modifying at least one of a weight, a delay, or an afferent of the reusable synapse.

* * * * *